United States Patent
Gambini et al.

(10) Patent No.: US 11,302,933 B2
(45) Date of Patent: Apr. 12, 2022

(54) ELECTROCHEMICAL CELLS WITH IMPROVED FLUID FLOW DESIGN

(71) Applicant: Nuvera Fuel Cells, LLC, Billerica, MA (US)

(72) Inventors: Filippo Gambini, Boston, MA (US); Scott Blanchet, Chelmsford, MA (US); Olga Polevaya, Needham, MA (US); Edward Domit, Westford, MA (US); Andrew Baugher, Brighton, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 373 days.

(21) Appl. No.: 16/249,934

(22) Filed: Jan. 17, 2019

(65) Prior Publication Data

US 2019/0221867 A1 Jul. 18, 2019

Related U.S. Application Data

(60) Provisional application No. 62/618,228, filed on Jan. 17, 2018.

(51) Int. Cl.
*H01M 2/40* (2006.01)
*H01M 8/0258* (2016.01)
(Continued)

(52) U.S. Cl.
CPC ......... *H01M 8/0258* (2013.01); *H01M 8/026* (2013.01); *H01M 8/0232* (2013.01);
(Continued)

(58) Field of Classification Search
CPC ............ H01M 8/0258; H01M 8/2483; H01M 8/0232; H01M 8/0254; H01M 8/026;
(Continued)

(56) References Cited

U.S. PATENT DOCUMENTS 6,551,736 B1 * 4/2003 Gurau ................. H01M 8/0263
429/480
9,478,812 B1 * 10/2016 Darga ................. H01M 8/0247
(Continued)

OTHER PUBLICATIONS

PCT Invitation to Pay Additional Fees issued in International Application No. PCT/US2019/013986, dated Apr. 1, 2019, 14 pages.
(Continued)

*Primary Examiner* — Jane J Rhee
(74) *Attorney, Agent, or Firm* — Finnegan, Henderson, Farabow, Garrett & Dunner LLP

(57) ABSTRACT

An electrochemical cell stack having a plurality of electrochemical cells stacked along a longitudinal axis. The electrochemical cells include a membrane electrode assembly comprising a cathode catalyst layer, an anode catalyst layer, and a polymer membrane interposed between the cathode catalyst layer and the anode catalyst layer. The electrochemical cells also include an anode plate and a cathode plate with the membrane electrode assembly interposed therebetween, and the anode plate defines a plurality of channels that form an anode flow field facing the anode catalyst layer. The electrochemical cells further include a cathode flow field positioned between the cathode plate and the cathode catalyst layer, wherein the cathode flow field comprises a porous structure.

23 Claims, 19 Drawing Sheets

(51) Int. Cl.
*H01M 8/0232* (2016.01)
*H01M 8/1004* (2016.01)
*H01M 8/2483* (2016.01)
*H01M 8/0254* (2016.01)
*H01M 8/0265* (2016.01)
*H01M 8/0267* (2016.01)
*H01M 8/026* (2016.01)
*H01M 8/10* (2016.01)

(52) U.S. Cl.
CPC ....... *H01M 8/0254* (2013.01); *H01M 8/0265* (2013.01); *H01M 8/0267* (2013.01); *H01M 8/1004* (2013.01); *H01M 8/2483* (2016.02); *H01M 2008/1095* (2013.01)

(58) Field of Classification Search
CPC ............. H01M 8/0265; H01M 8/0267; H01M 8/1004; H01M 2008/1095
See application file for complete search history.

(56) References Cited

U.S. PATENT DOCUMENTS

| | | |
|---|---|---|
| 2009/0169964 A1 | 7/2009 | Ikeda |
| 2010/0178580 A1 | 7/2010 | Connor et al. |
| 2011/0177422 A1* | 7/2011 | Wolk ................ H01M 8/04201 |
| | | 429/478 |
| 2011/0207018 A1 | 8/2011 | Nakagawa et al. |
| 2015/0333340 A1* | 11/2015 | Lunt .................. H01M 8/0232 |
| | | 204/275.1 |

OTHER PUBLICATIONS

Notification of Transmittal of the International Search Report and the Written Opinion of the International Searching Authority issued in International Application No. PCT/US2019/013986, dated May 27, 2019, 19 pages.

* cited by examiner

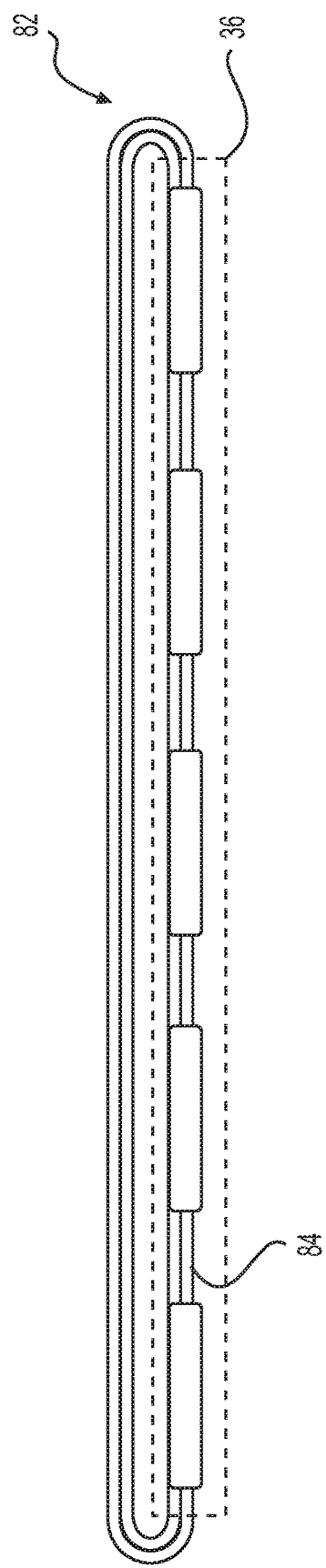
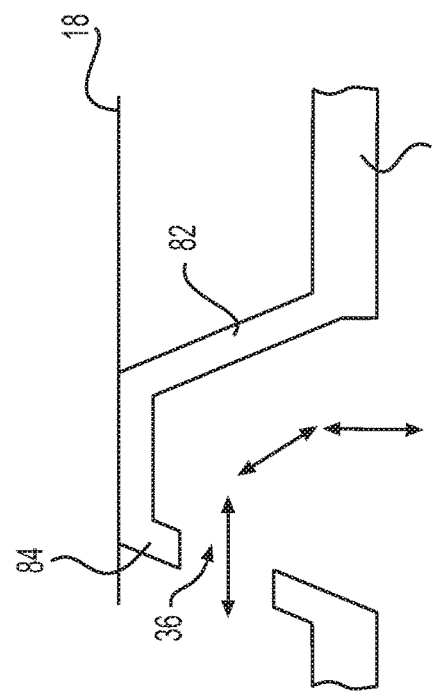
FIG. 8A
FIG. 8B

ELECTROCHEMICAL CELLS WITH IMPROVED FLUID FLOW DESIGN

This application claims the benefit of U.S. Provisional Application No. 62/618,228, filed Jan. 17, 2018, which is incorporated by reference in its entirety.

The present disclosure is directed towards electrochemical cells, and more particularly, to electrochemical cells with improved fluid flow design.

Electrochemical cells, usually classified as fuel cells or electrolysis cells, are devices used for generating current from chemical reactions, or inducing a chemical reaction using a flow of current. For example, a fuel cell converts the chemical energy of fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrons then flow through the circuit to the cathode and generate electricity, while the protons diffuse through the electrolyte membrane to the cathode. At the cathode, hydrogen protons combine with electrons and oxygen (supplied to the cathode) to produce water and heat.

An electrolysis cell represents a fuel cell operated in reverse. A basic electrolysis cell functions as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion. Electrochemical hydrogen manipulation has emerged as a viable alternative to the mechanical systems traditionally used for hydrogen management. Successful commercialization of hydrogen as an energy carrier and the long-term sustainability of a "hydrogen economy" depend largely on the efficiency and cost-effectiveness of fuel cells, electrolysis cells, and other hydrogen manipulation/management systems.

In operation, a single fuel cell can generally generate about 1 volt. To obtain the desired amount of electrical power, individual fuel cells are combined to form a fuel cell stack, wherein fuel cells are stacked together sequentially. Each fuel cell may include a cathode, an electrolyte membrane, and an anode. A cathode/membrane/anode assembly constitutes a "membrane electrode assembly," or "MEA," which is typically supported on both sides by bipolar plates. Reactant gases or fuel (e.g., hydrogen) and oxidant (e.g., air or oxygen) are supplied to the electrodes of the MEA through flow fields. In addition to providing mechanical support, the bipolar plates (also known as flow field plates or separator plates) physically separate individual cells in a stack while electrically connecting them. A typically fuel cell stack includes manifolds and inlet ports for directing the fuel and oxidant to the anode and cathode flow fields, respectively. A fuel cell stack also includes exhaust manifolds and outlet ports for expelling the excess fuel and oxidant. A fuel cell stack may also include manifolds for circulating coolant fluid to help expel heat generated by the fuel cell stack.

In fuel cells it is desirable to have full and even distribution of the fuel and oxidant throughout the flow fields in order to maximize the active area of the MEA utilized, which improves the overall performance. But, prior art fuel cell designs have struggled to achieve even and full distribution. Additionally, it is desirable not to create excessive pressure drop along the flow path of the fuel and the oxidant, which can otherwise consume some of the electrical energy generated by the fuel cell stack and decrease the overall efficiency of the fuel cells stack. As such, there is a continuing challenge to improve the flow design of fuel cells.

Another way to improve the overall performance and power density of a fuel cell stack can be to reduce the pitch (i.e., spacing) between adjacent cells of the fuel cell stack and/or thickness of the cells. Cell thickness can be reduced, for example, by reducing the thickness of the flow fields of each individual fuel cell. This, however, can be difficult to achieve without creating an excessive pressure drop along the fuel and oxidant flow path due to the reduction in the flow path caused by compression of the fuel cell stack, which can increase the load on the fuel cell stack.

In consideration of the aforementioned circumstances, the present disclosure is directed toward a fuel cell and fuel cell stack design having improved flow design and improved performance and power density.

In one aspect, the present disclosure is directed to an electrochemical cell stack having a plurality of electrochemical cells stacked along a longitudinal axis. The electrochemical cells may each include a membrane electrode assembly comprising a cathode catalyst layer, an anode catalyst layer, and a polymer membrane interposed between the cathode catalyst layer and the anode catalyst layer. The electrochemical cells may each further include an anode plate and a cathode plate with the membrane electrode assembly interposed therebetween, and the anode plate defines a plurality of channels that form an anode flow field facing the anode catalyst layer. The electrochemical cells may each also include a cathode flow field positioned between the cathode plate and the cathode catalyst layer, wherein the cathode flow field comprises a porous structure. In some embodiments, the electrochemical cells may each include a first manifold section that includes an anode feed manifold and a second manifold section that includes an anode discharge manifold; a first anode distribution channel positioned between the first manifold section and the anode flow field configured to distribute fuel supplied from the anode feed manifold to the anode flow field; and a second anode distribution channel positioned between the second manifold section and the anode flow field configured to collect fuel from the anode flow field and direct the fuel to the anode discharge manifold. In some embodiments, the first anode distribution channel and the second anode distribution channel may be formed between and defined by the membrane electrode assembly and the anode plate along the longitudinal axis. In some embodiments, the first anode distribution channel and the second anode distribution channel may extend a width of the anode flow field. In some embodiments, the first anode distribution channel and the second anode distribution channel may have a plurality of support features positioned within. In some embodiments, the support features may be evenly spaced throughout the first anode distribution channel and second anode distribution channel. In some embodiments, the support features may be dimple shaped. In some embodiments, the support features may extend from the anode plate in opposite directions along the longitudinal axis. In some embodiments, a distance $D_C$ between the support features over a thickness $t_p$ of the cathode plate may range between about 3 and about 50. In some embodiments, the distance $D_C$ between the support features is about 1.5 mm and the thickness $t_p$ of the cathode plate is about 0.1 mm. In some embodiments, the electrochemical cells may each include a plurality of orifice openings fluidly connecting first anode distribution channel with the anode flow field. In some embodiments, the number of orifice openings may correspond to the number of channels in the anode flow field. In some embodiments, the orifice openings may be configured to apply a back pressure on the fuel in the first anode distribution channel, which causes the fuel to fill the first anode distribution channel during operation of the electrochemical cell stack.

In another aspect, the present disclosure is directed to an electrochemical cell stack having a plurality of electrochemical cells stacked along a longitudinal axis. The electrochemical cells may each include a membrane electrode assembly comprising a cathode catalyst layer, an anode catalyst layer, and a polymer membrane interposed between the cathode catalyst layer and the anode catalyst layer; an anode plate and a cathode plate with the membrane electrode assembly interposed therebetween, and the anode plate defines a plurality of channels that form an anode flow field facing the anode catalyst layer; and a cathode flow field positioned between the cathode plate and the cathode catalyst layer, wherein the cathode flow field comprises a porous structure; wherein the porous structure is a porous metallic foam structure that has a first cathode distribution channel and a second cathode distribution channel recessed into a surface of the porous metallic foam structure facing the cathode plate. wherein the porous metallic foam structure includes support features formed throughout the first cathode distribution channel and the second cathode distribution channel. In some embodiments, the support features may be dimple, semi-spherical, cone, or cylindrical shaped. In some embodiments, the first cathode distribution channel, the second cathode distribution channel, and the support features may be formed by stamping of the porous metallic foam structure. In some embodiments, the first cathode distribution channel and the second cathode distribution channel may be configured to promote uniform flow distribution of oxidant along a width of the cathode flow field. In some embodiments, the porous structure may have a plurality of interdigitated feed channels and discharge channels stamped into the surface of the porous metallic foam structure facing the cathode plate, wherein the feed channels start at and are in fluid communication with the first cathode distribution channel and extend toward the second cathode distribution channel, and the discharge channels end at and are in fluid communication with the second cathode distribution channel and extend toward the first cathode distribution channel. In some embodiments, the width and/or the depth of the feed channels and the discharge channels may vary along the length of the porous metallic foam structure. In some embodiments, the width of the feed channels may narrow extending away from the first cathode distribution channel toward the second cathode distribution channel while the width of the discharge channels widens extending away from the first cathode distribution channel toward the second cathode distribution channel. In some embodiments, the depth of the feed channels may decrease extending away from the first cathode distribution channel toward the second cathode distribution channel while the depth of the discharge channels increases extending away from the first cathode distribution channel toward the second cathode distribution channel. In some embodiments, the cross-sectional area of the feed channels may decrease extending away from the first cathode distribution channel toward the second cathode distribution channel while the cross-sectional area of the discharge channels increases extending away from the first cathode distribution channel toward the second cathode distribution channel. In some embodiments, the cross-sectional area of the feed channels may decrease at a rate about equal to the rate at which oxidant flows out of the feed channels and diffuses into the porous metallic foam structure, and the cross-sectional area of the discharge channels may increase at a rate about equal to the rate at which oxidant flows out of the porous metallic foam structure into the discharge channels, thereby maintaining a velocity of oxidant about constant through the feed channels and the discharge channels. In some embodiments, the porous metallic foam structure may include land sections formed between the feed channels and the discharge channels, wherein the thickness of the land sections vary along the length of the porous metallic foam structure.

In another aspect, the present disclosure is directed to an electrochemical cell having a membrane electrode assembly comprising a cathode catalyst layer, an anode catalyst layer, and a polymer membrane interposed between the cathode catalyst layer and the anode catalyst layer. The electrochemical cell may also have an anode plate and a cathode plate with the membrane electrode assembly interposed therebetween, and the anode plate defines a plurality of channels that form an anode flow field facing the anode catalyst layer. The electrochemical cell may further include a cathode flow field positioned between the cathode plate and the cathode catalyst layer, wherein the cathode flow field comprises a porous structure.

In another aspect, the present disclosure is directed to an electrochemical cell stack having a plurality of electrochemical cells stacked along a longitudinal axis. The electrochemical cells may each include a membrane electrode assembly comprising a cathode catalyst layer, an anode catalyst layer, and a polymer membrane interposed between the cathode catalyst layer and the anode catalyst layer. The electrochemical cells may each further include an anode plate and a cathode plate with the membrane electrode assembly interposed therebetween, and the anode plate defines a plurality of channels that form an anode flow field facing the anode catalyst layer. The electrochemical cells may each also include a cathode flow field positioned between the cathode plate and the cathode catalyst layer, wherein the cathode flow field comprises a porous structure. The plurality of channels forming the anode flow field may be generally square shaped corrugated channels, the plurality of channels include anode channels open to the anode side configured to direct the flow of fuel across the anode catalyst layer, the plurality of channels also include coolant channels open to the reverse side configured to direct coolant flow. In some embodiments, the coolant channels may each have a coolant channel width of A and the anode channels each may have an anode channel width of B and a ratio of the coolant channel width A over the anode channel width B may be greater than about 1 and less than about 6. In some embodiments, the ratio of the coolant channel width A over the anode channel width B may be greater than about 2 and less than about 4. In some embodiments, a depth of the coolant channels and the anode channels is about equal, and the channel depth is S, and the ratio of the coolant channel width A plus the anode channel width B divided by the depth S is greater than about 2 and less than about 10. In some embodiments, a compressive load applied to the fuel cell during operation may range from about 10 kg/cm² to about 75 kg/cm². In some embodiments, the porous structure may include at least nickel and chromium. In some embodiments, the porous structure may include a nickel concentration of 60% to 80% by mass and a chromium concentration of 20% to 40% by mass and at least one surface of the porous structure may include a chromium concentration of about 3% to about 50% by mass. In some embodiments, the porous structure may include a chromium concentration of about 3% to about 6%, a tin concentration of about 10% to about 20%, and a nickel concentration of about 74% to about 87%. In some embodiments, a first surface of the porous structure may have a higher chromium concentration than an opposite second surface. In some embodiments, the first surface may have a chromium concentration ranging from about 3% to about 50% by mass and the second surface has a chromium concentration less than about 3% by mass. In some embodiments, the first surface of the porous structure may face the membrane electrode assembly. In some embodiments, the cathode plate of each cell may be formed of uncoated stainless steel.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

FIG. 8A is an enlarged view of a portion of FIG. 6.

FIG. 8B is a cross-sectional schematic of a portion of FIG. 8A.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to an electrochemical cell, in particular, a fuel cell employing hydrogen, oxygen, and water, it is understood that the devices and methods of the present disclosure can be employed with various types of fuel cells and electrochemical cells, including, but not limited to electrolysis cells, hydrogen purifiers, hydrogen expanders, and hydrogen compressors.

Throughout the specification the terms "generally parallel" and "generally perpendicular" may be used to describe the arrangement of one or more components in relation to an axis, plane, or other component. The degree of offset from parallel and perpendicular that can be tolerated when describing an arrangement as "generally parallel" or "generally perpendicular" can vary. The allowable offset may be, for example, less than about 20 degrees off, such as an offset less than about 10 degrees, an offset of less than about 5 degrees, and offset of less than about 3 degrees, an offset of less than about 2 degrees, and an offset of less than about 1 degree.

Figure 1:
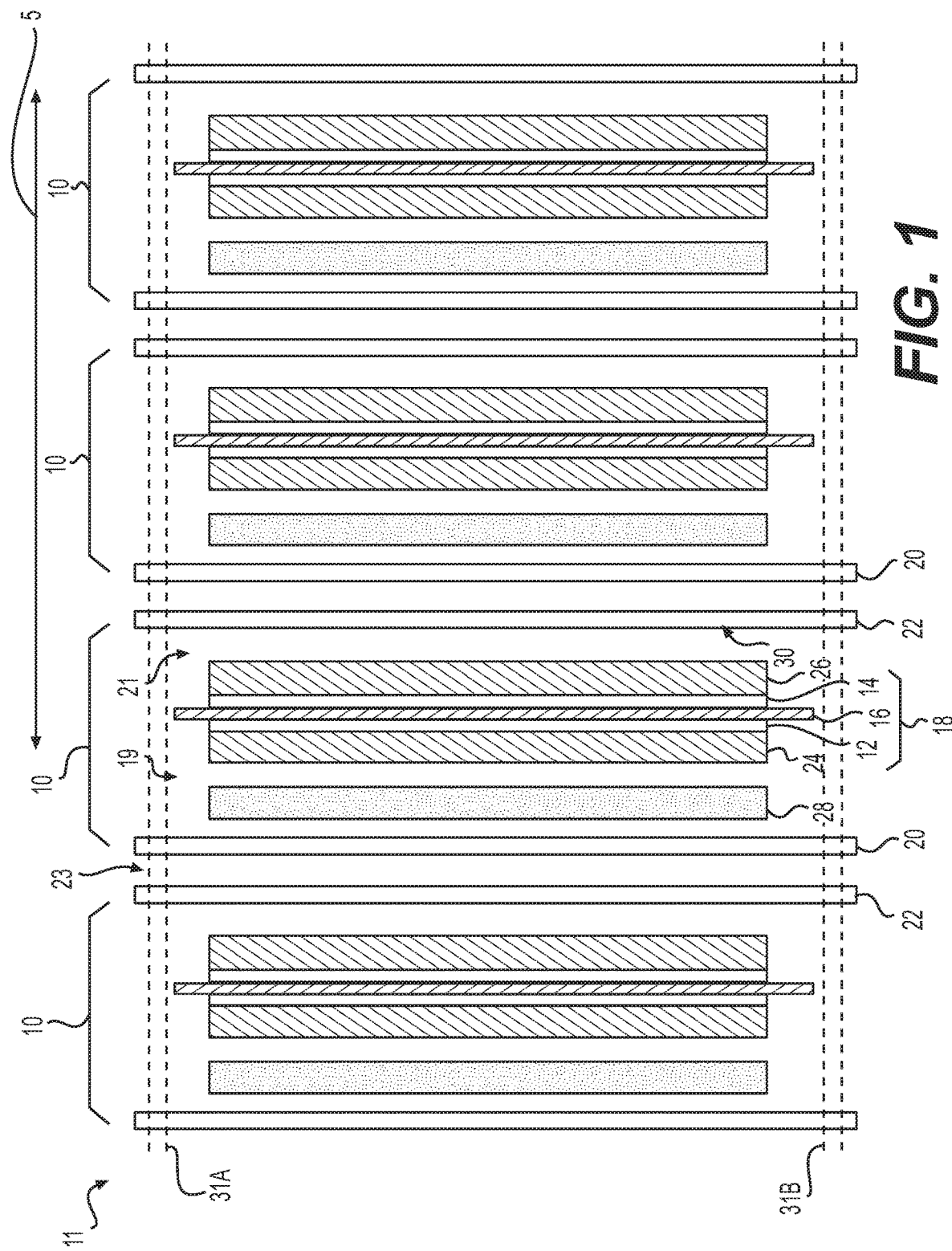
FIG. 1 is a side schematic view of a plurality of electrochemical cells (e.g., fuel cells) stacked together, according to an exemplary embodiment.

FIG. 1 is a side schematic side view of a plurality of electrochemical cells, for example, fuel cells 10 stacked together along a longitudinal axis 5 to form at least a portion of a fuel cell stack 11, according to an exemplary embodiment. A fuel cell 10 can comprise a cathode catalyst layer 12, which may also be referred to herein as a cathode, an anode catalyst layer 14, which may also be referred to herein a anode, and a proton exchange membrane (PEM) 16 interposed between cathode catalyst layer 12 and anode catalyst layer 14, which collectively may be referred to as a membrane electrode assembly (MEA) 18. PEM 16 can comprise a pure polymer membrane or composite membrane with other material, for example, silica, heteropolyacids, layered metal phosphates, phosphates, and zirconium phosphates can be embedded in a polymer matrix. PEM 16 can be permeable to protons while not conducting electrons. Cathode catalyst layer 12 and anode catalyst layer 14 can comprise porous carbon electrodes containing a catalyst. The catalyst material, for example platinum, platinum-cobalt alloy, non-PGM, can increase the reaction of oxygen and fuel. In some embodiments, cathode catalyst layer 12 and anode catalyst layer 14 may have an average pore size of about 1 µm.

Fuel cell 10 can comprise two bipolar plates, for example, a cathode plate 20 and an anode plate 22. Cathode plate 20 may be positioned adjacent cathode catalyst layer 12 and anode plate 22 may be positioned adjacent anode catalyst layer 14. MEA 18 can be interposed and enclosed between cathode plate 20 and anode plate 22. A cathode compartment 19 may be formed between MEA 18 and cathode plate 20 and an anode compartment 21 may be formed between MEA 18 and anode plate 22. Cathode plate 20 and anode plate 22 can act as current collectors, provide access flow passages for fuel and oxidant to the respective electrode surfaces (e.g., anode catalyst layer 14 and cathode catalyst layer 12), and provide flow passages for the removal of water formed during operation of fuel cell 10. Cathode plate 20 and anode plate 22 can also define flow passages for coolant fluid (e.g., water, glycol, or water glycol mixture). For example, between cathode plate 20 and anode plate 22 of adjacent fuel cells 10 a coolant compartment 23 may be formed, which is configured to circulate coolant fluid between adjacent fuel cells 10. Heat generated by fuel cells 10 can be transferred to the coolant fluid and be carried away by the circulation of the coolant fluid. Cathode plate 20 and anode plate 22 may be made from, for example, aluminum, steel, stainless steel, titanium, copper, Ni—Cr alloy, graphite or any other suitable electrically conductive material.

In some embodiments, for example, as illustrated in FIG. 1, fuel cell 10 may also include electrically-conductive gas diffusion layers (e.g., cathode gas diffusion layer 24 and anode gas diffusion layer 26) within fuel cell 10 on each side of MEA 18. Gas diffusion layers 24, 26 may serve as diffusion media enabling the transport of gases and liquids within the cell, provide electrically conduction between cathode plate 20, anode plate 22, and MEA 18, aid in the removal of heat and process water from fuel cell 10, and in some cases, provide mechanical support to PEM 16. Gas diffusion layers 24, 26 can comprise a woven or non-woven carbon cloth with cathode catalyst layer 12 and anode catalyst layer 14 coated on the sides facing PEM 16. In some embodiments, cathode catalyst layer 12 and anode catalyst layer 14 may be coated onto either the adjacent GDL 24, 26 or PEM 16. In some embodiments, gas diffusion layers 24, 26 may have an average pore size of about 10 μm.

Fuel cell 10 may further include flow fields positioned on each side of MEA 18. For example, fuel cell 10 may include a cathode flow field 28, which may comprise a porous structure positioned between cathode plate 20 and GDL 24 and an anode flow field 30, which may be formed by anode plate 22, as described further herein. The flow fields may be configured to enable fuel and oxidant on each side of MEA 18 to flow through and reach MEA 18. It is desirable that these flow fields facilitate the even distribution of fuel and oxidant to cathode and anode catalyst layers 12, 14 so as to achieve high performance of fuel cell 10. GDL 24 may provide mechanical protection of cathode catalyst layer 12 from cathode flow field 28.

It is to be understood that although only one fuel cell 10 in FIG. 1 includes reference numerals for cathode catalyst layer 12, anode catalyst layer 14, proton exchange membrane 16, membrane electrode assembly (MEA) 18, cathode compartment 19, cathode plate 20, anode compartment 21, anode plate 22, coolant compartment 23, gas diffusion layer 24, gas diffusion layer 26, cathode flow field 28, and anode flow field 30, the other fuel cells 10 of stack 11 may include the same elements.

Fuel cell stack 11 may also include a plurality of fluid manifolds 31A, 31B extending along longitudinal axis 5 defined by the series of stacked cathode plates 20 and anode plates 22 of fuel cells 10. Fluid manifolds 31A, 31B may be configured for feeding fuel (e.g., hydrogen) and oxidant (e.g., oxygen) to MEA 18 of each fuel cell 10 and discharging reactant products (e.g., unreacted fuel, unreacted oxidant, and water) from MEA 18 of each fuel cell. Fluid manifolds 31A, 31B may also be configured for feeding and discharging coolant fluid through coolant compartments 23. The direction of flow through fluid manifolds 31A, 31B, cathode compartments 19, anode compartments 21, and coolant compartments 23 may vary. For example, in some embodiments the flow through the manifolds and compartments may be concurrent while in other embodiments, one or more of the flow paths may be countercurrent. For example, in some embodiments, the flow of fuel through anode compartment 21 may be countercurrent to the flow of oxidant through cathode compartments 19. Fluid manifolds 31A, 31B may fluidly connect to MEA 18 via passages and ports. Specific manifolds, passages, and ports may be identified herein by "feed" or "discharge" and "inlet" or "outlet," but it is to be understood these designations may be determined based on the direction of flow and the direction of flow may be switched. Changing the direction of flow may change these designations.

Figure 2:
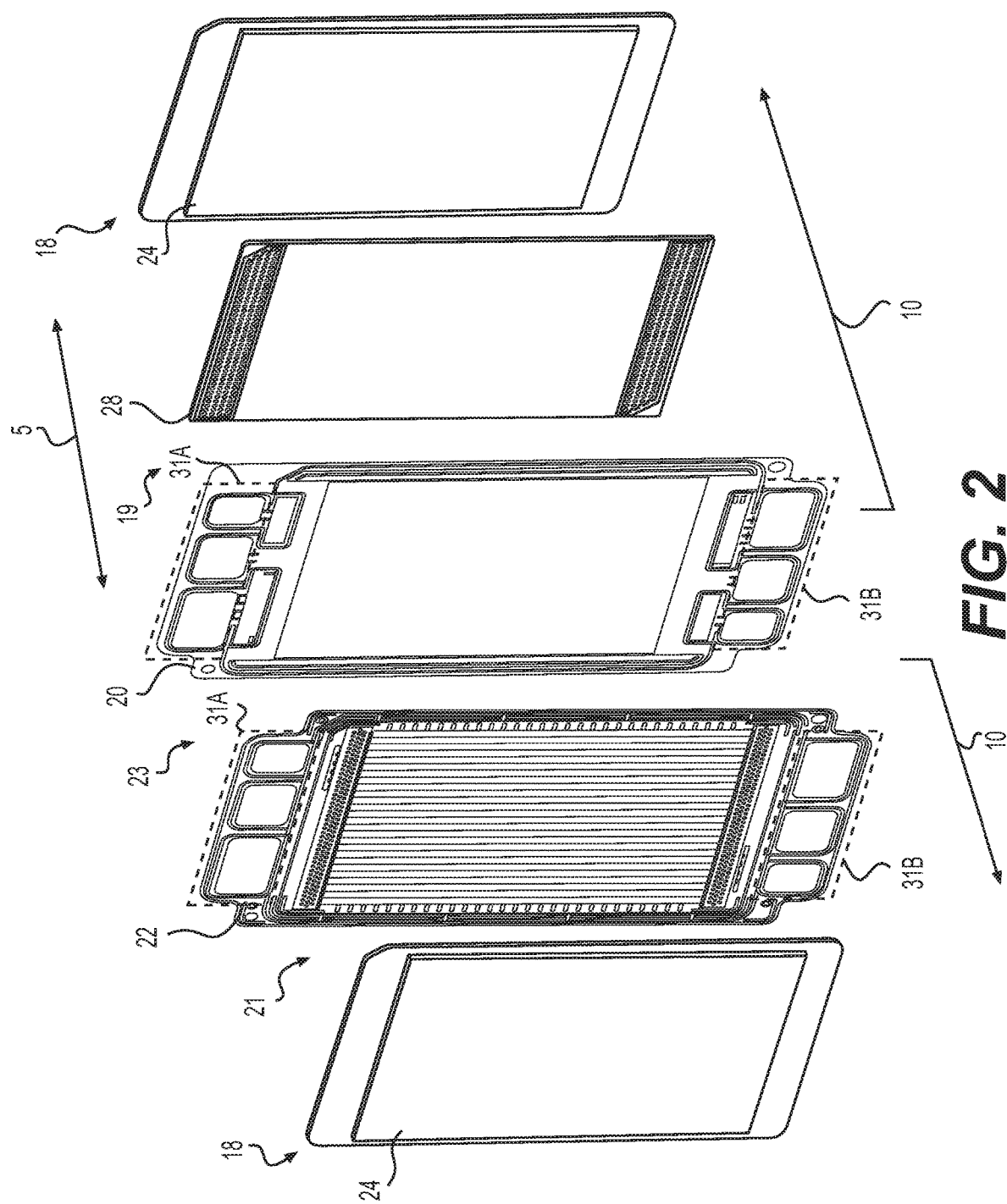
FIG. 2 is a partially exploded side-perspective view of portions of adjacent fuel cells of FIG. 1, according to an exemplary embodiment.

FIG. 2 shows a partially exploded side-perspective view of portions of adjacent fuel cells 10. For example, FIG. 2 shows MEA 18, GDL 24, and anode plate 22 of one fuel cell 10 and also cathode plate 20, cathode flow field 28, MEA 18, and GDL 24 of an adjacent fuel cell 10. Anode compartment 21 may be formed between adjacent MEA 18 and anode plate 22. Coolant compartment 23 may be formed between adjacent anode plate 22 and cathode plate 20. Cathode compartment 19 may be formed between adjacent cathode plate 20 and MEA 18, which may contain cathode flow field 28. As shown in FIG. 2, fuel cells 10 may include fluid manifolds 31A, 31B, which may also be referred to as upper and lower fluid manifolds. Fluid manifolds 31A, 31B may extend along longitudinal axis.

Figure 3:
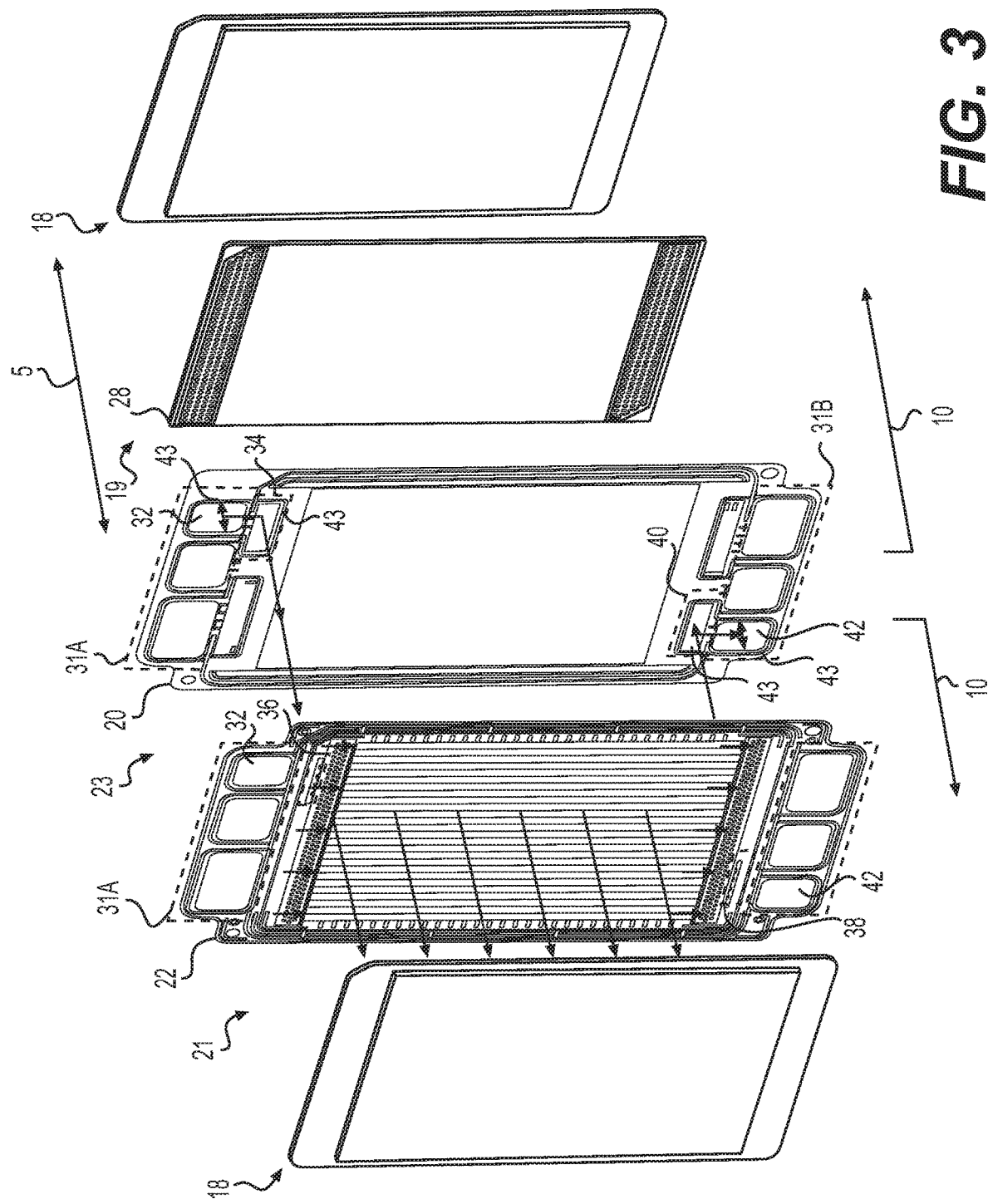
FIG. 3 is a side perspective view of FIG. 2 illustrating a flow path of fuel through a fuel cell, according to an exemplary embodiment.
Figure 4:
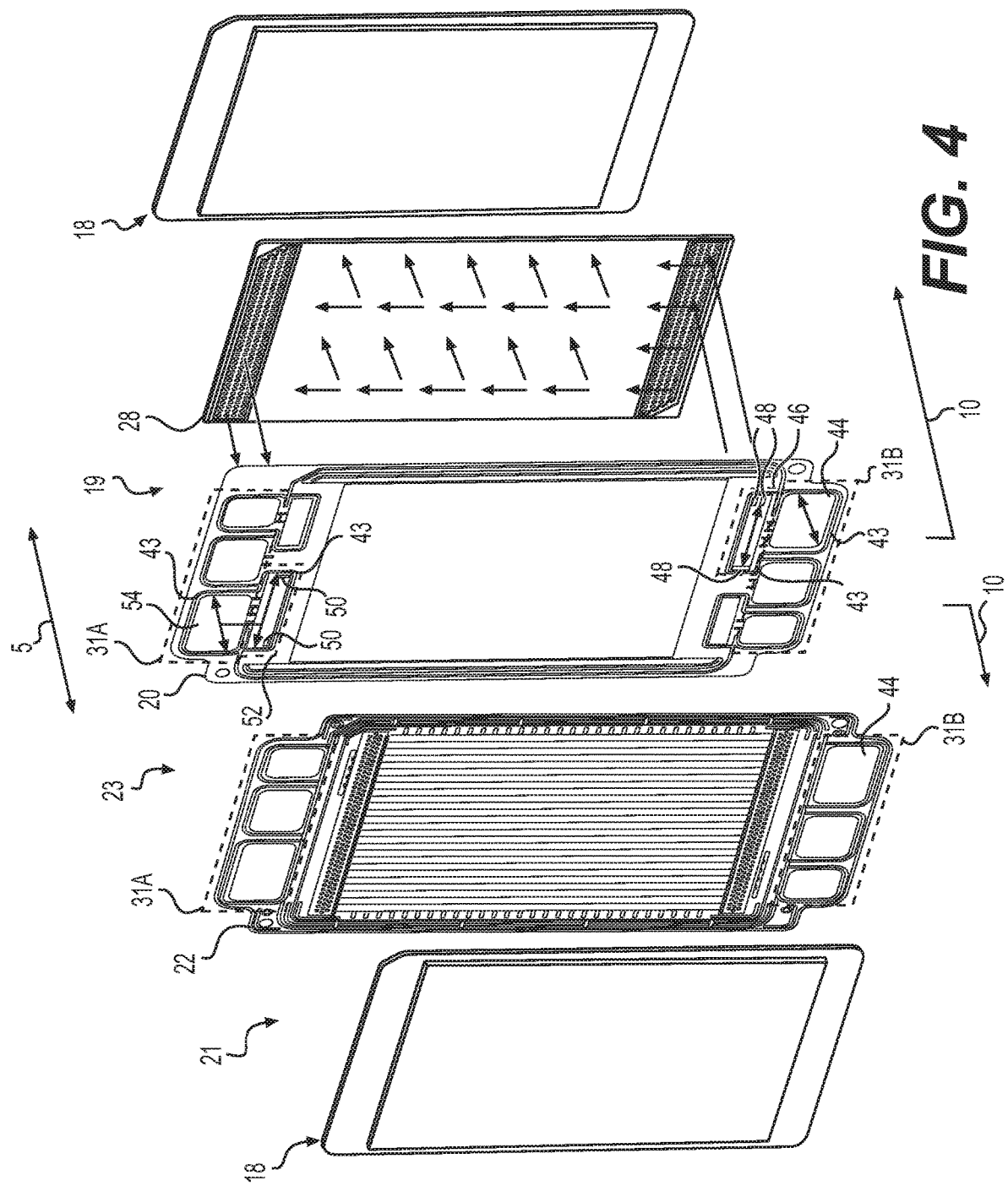
FIG. 4 is a side perspective view of FIG. 2 illustrating a flow path of oxidant through a fuel cell, according to an exemplary embodiment.
Figure 5:
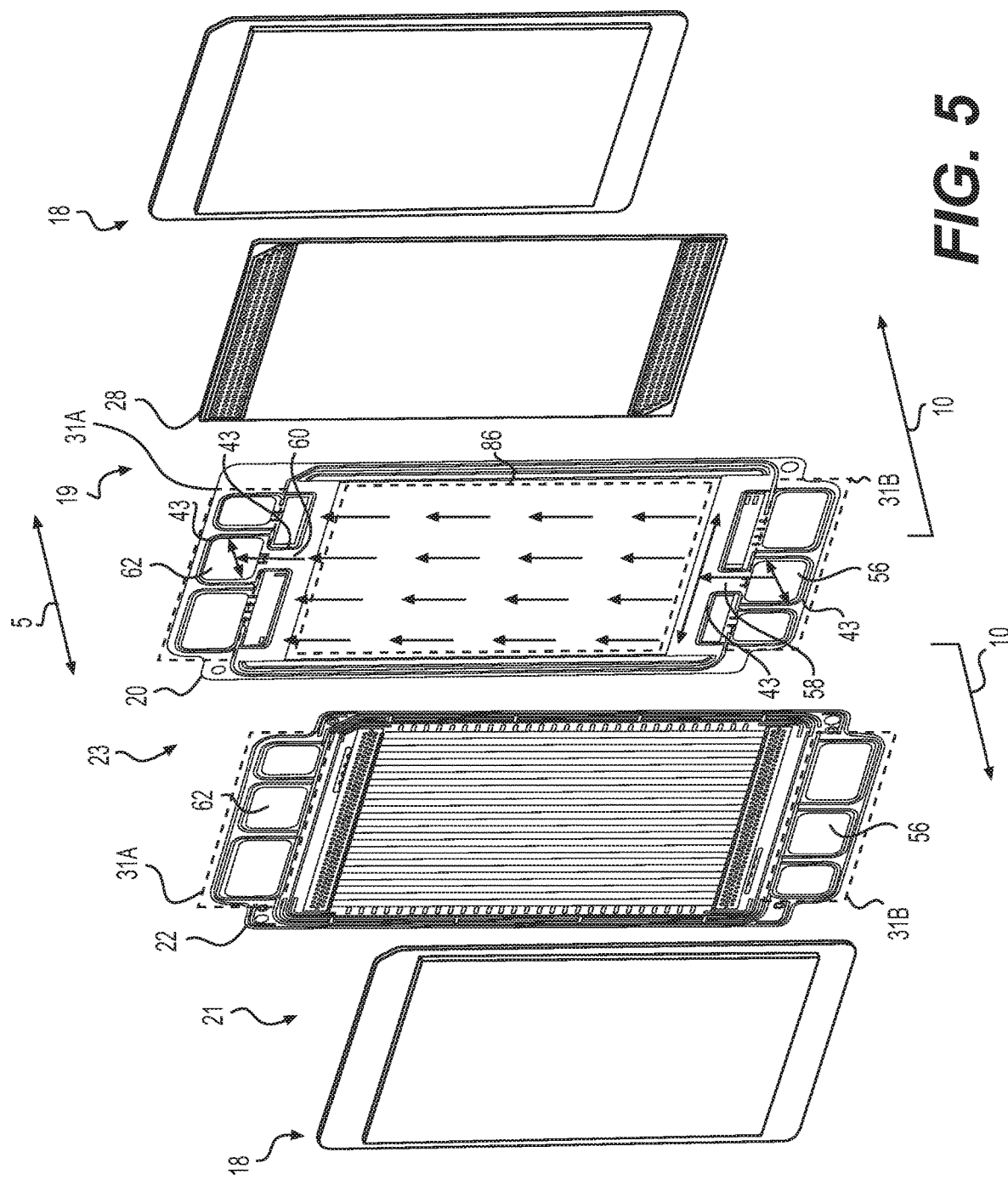
FIG. 5 is a side perspective view of FIG. 2 illustrating a flow path of coolant fluid through adjacent fuel cells, according to an exemplary embodiment.

FIGS. 3-5 illustrate flow paths of fuel, oxidant, and cooling fluid through fuel cells 10, according to one illustrative embodiment. But it is to be understood that for other embodiments the direction of one or more of the flow paths may be switched, for example, by reversing the direction of flow. FIG. 3 illustrates a flow path for fuel circulated through the anode side of MEA 18 of fuel cell 10, FIG. 4 illustrates a flow path for oxidant circulated through the cathode side of MEA 18 of fuel cell 10, and FIG. 5 illustrates a flow path for coolant fluid circulated between adjacent fuel cells 10.

Referring now to FIG. 3, first fluid manifolds 31A may include at least one anode feed manifold 32 that may fluidly connect and direct fuel through at least one anode inlet passage 34 through at least one anode inlet port 36 into anode compartment 21. Fuel (e.g., unreacted fuel) from anode compartment 21 may be directed from anode compartment 21 through at least one anode outlet port 38 through at least one anode outlet passage 40 into at least one anode discharge manifold 42. Anode inlet passage 34 and anode outlet passage 40 may be located between anode plate 22 and cathode plate 20 of adjacent fuel cells 10. Perimeters of anode inlet passage 34 and anode outlet passage 40, as well as anode feed manifold 32 and anode discharge manifold 42, may be sealed by surface gaskets 43, as illustrated in FIG. 3. Surface gaskets 43 may be made of a polymeric or elastomeric material such as silicone, Viton, Buna, polyethylene, polypropylene, or any other suitable seal material. The cross-sectional shape of surface gaskets 43 may be rectangular, triangular, semi-circular, multi-tooth (triangle), or parabolic. The shape may be determined by the acceptable leak rate, operating pressures, tolerance make-up, or other significant sealing design parameters. Surface gaskets 43 can be applied with any known method such as injection molding, compression molding, pick-and-place, robotic dispensing, and may be adhered directly through a molding process or with the aid of pressure or temperature-sensitive adhesives. Curing of surface gaskets 43 can be accomplished by known processes such as thermal curing, ultraviolet-light curing, or humidity cures.

As shown in FIG. 4, second fluid manifolds 31B may include at least one cathode feed manifold 44 that may fluidly connect and direct oxidant through at least one cathode inlet passage 46 through at least one cathode inlet port 48 into cathode compartment 19. Oxidant from cathode compartment 19 may be directed from cathode compartment 19 through at least one cathode outlet port 50 through at least one cathode outlet passage 52 into at least one cathode discharge manifold 54. Cathode inlet passage 46 and cathode outlet passage 52 may be located between anode plate 22 and cathode plate 20 of adjacent fuel cells 10. Perimeters of cathode inlet passage 46 and cathode outlet passage 52, as well as cathode feed manifold 44 and cathode discharge manifold 54 may be sealed by surface gaskets 43, as illustrated in FIG. 4.

As shown in FIG. 5, second fluid manifolds 31B may include at least one coolant feed manifold 56 that may fluidly connect and direct coolant fluid through at least one coolant inlet passage 58 to a coolant flow field 86 within coolant compartment 23. Within coolant compartment 23 the coolant fluid may flow between anode plate 22 and cathode plate 20 through coolant flow field 86 comprised of a plurality of coolant channels defined by anode plate 22, as will be described further herein. Heat generated by adjacent fuel cells 10 may be transferred to the coolant fluid and removed from fuel cells 10 by the circulation of the coolant fluid. The coolant fluid from coolant compartment 23 may be directed through at least one coolant outlet passage 60 into at least one coolant discharge manifold 62. Coolant inlet passage 58 and coolant outlet passage 60 may be located between anode plate 22 and cathode plate 20 of adjacent fuel cells 10. Perimeters of coolant inlet passage 58 and coolant outlet passage 60, as well as coolant feed manifold 56 and coolant discharge manifold 62 may be sealed by surface gaskets 43, as illustrated in FIG. 5.

Figure 6:
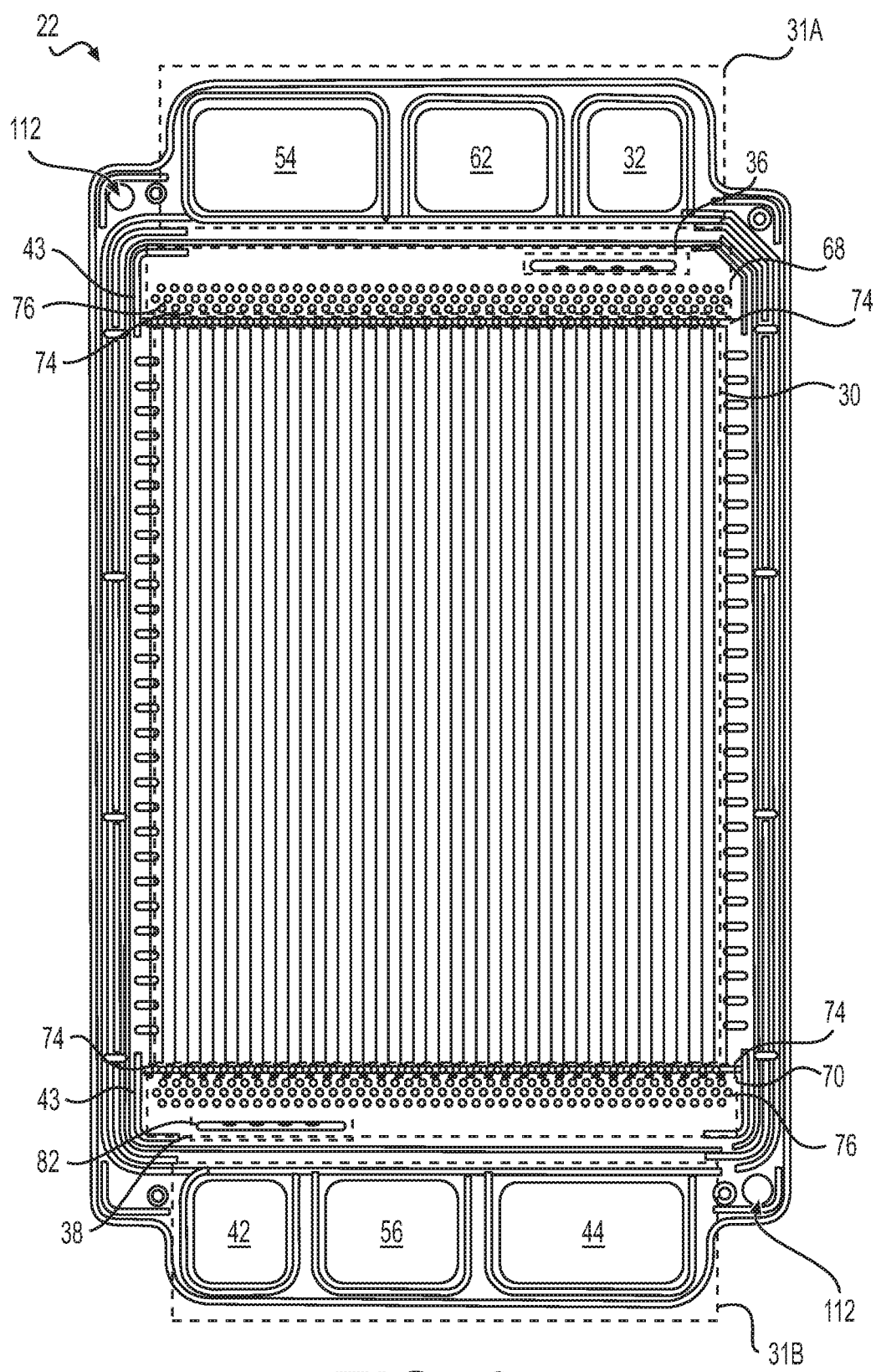
FIG. 6 is a front view of an anode plate of FIG. 2, according to an exemplary embodiment.

FIG. 6 is a front view of anode plate 22, according to exemplary embodiment. The side visible in FIG. 6 is the side configured to face the anode side of MEA 18 (i.e., anode catalyst layer 14 and gas diffusion layer 26) and define one side of anode compartment 21 (see e.g., FIGS. 1 and 2). Anode plate 22 may include several sections. These sections may include for example, first manifold section 31A and second manifold section 31B, distribution channel sections, for example, a first anode distribution channel 68 and a second anode distribution channel 70, and anode flow field 30. As shown in FIG. 6, anode plate 22 may include anode feed manifold 32, cathode discharge manifold 54, and coolant discharge manifold 62 in first manifold section 31A while second manifold section 31B may include anode discharge manifold 42, cathode feed manifold 44, and coolant feed manifold 56. It is to be understood, that the designation of inlet and outlet for each manifold may be switched, for example, by switching the respective flow direction of the fuel, the oxidant, or the coolant fluid flow through fuel cells 10.

The cross-sectional area of each manifold can vary. For example, as shown in FIG. 6, cathode feed and discharge manifolds 44, 54 may have larger cross-sectional areas than coolant feed and discharge manifolds 56, 62 while coolant feed and discharge manifolds 56, 62 may have larger cross-sectional areas than anode feed and discharge manifolds 32, 42. The cross-sectional area of each passage may be determined based on a variety of variables, including for example, the number of cells, current density at peak-power operating conditions, design stoichiometry of the reactants, the difference between the inlet and outlet coolant temperature, flow resistance of individual cells, the size of active area, fluid pressure, and fluid flow rate. The cross-sectional area of one or more passages may be sized so as to minimize fluid pressure variations along the length of the electrochemical cell stack, such as during high fluid flow rates.

The arrangement of the manifolds within first manifold section 31A and second manifold section 31B can also vary. As shown in FIG. 6, the arrangement of the manifolds may be different between first manifold section 31A and second manifold section 31B. In one illustrative example, as shown in FIG. 6, coolant discharge manifold 62 may be positioned between anode feed manifold 32 and cathode discharge manifold 54 and coolant feed manifold 56 may be positioned between anode discharge manifold 42 and cathode feed manifold 44. In some embodiments, cathode discharge manifold 54 may be left of coolant discharge manifold 62 and anode feed manifold 32 may be right of coolant discharge manifold 62 while cathode feed manifold 44 may be right of coolant feed manifold 56 and anode discharge manifold 42 may be left of coolant feed manifold 56. Swapping the positioning of the anode and cathode manifolds relative to the coolant manifolds between first manifold section 31A and second manifold section 31B may be advantageous because it promotes a diagonal cross countercurrent flow or "z-flow" rather than a straight across flow. The diagonal cross countercurrent flow may provide improved uniform distribution of fuel and oxidant in anode compartment 21 and cathode compartment 19, which may improve fuel cell performance. The performance may be improved because the diagonal cross countercurrent flow may optimize the active area utilized. With the z-flow pattern, the stream-path distance from inlet to outlet for one or more reactants may be substantially uniform regardless of the flow path. This symmetry may result in fluids distributing and flowing uniformly throughout the flow field. Uniform flow throughout the flow field 30 may result in more uniform and/or linear gradients of reactant composition and coolant temperature, which may result in uniform and/or linear gradients of cell temperature. This may result in higher performance and/or lower variance in performance between cells.

The positioning of the coolant manifolds 56, 62 in the center of first fluid manifold 31A and second fluid manifold 31B may be advantageous because the central region of the coolant compartment is most likely to receive the most coolant fluid flow and this area corresponds to the central region of the active area of fuel cell 10 where there may be increased heat generation and or a tendency for higher operating temperature. In other words, the region of the fuel cell 10 that will tend toward operating at higher temperature will correspond with the region receiving the most coolant fluid flow. In addition, the sides of fuel cell 10 may be aided by ambient cooling so promoting coolant fluid flow through the central region of coolant compartments 23 of each fuel cell is advantageous.

As shown in FIG. 6, positioned between first and second manifold sections 31A, 31B and anode flow field 30 are first and second anode distribution channels 68, 70. First anode distribution channel 68 may be configured to distribute fuel supplied from anode feed manifold 32 via anode inlet passage 34 through anode inlet port 36 to anode flow field 30. Second anode distribution channel 70 may be configured to collect fuel (e.g., unreacted fuel) from anode flow field 30 and direct fuel through anode outlet port 38 to anode discharge manifold 42 via anode outlet passage 40. First anode distribution channel 68 and second anode distribution channel 70 may be sandwich between and defined by MEA 18 and anode plate 22. Perimeters of first anode distribution channel 68 and second anode distribution channel 70 may be sealed by surface gaskets 43, as illustrated in FIG. 6. In some embodiments, a width of first anode distribution channel 68 and a width of second anode distribution channel 70 may be generally equal to a width of anode flow field 30.

First anode distribution channel 68 may be configured so fuel supplied through anode inlet port 36 may be distributed across a width of first anode distribution channel 68 and directed to anode flow field 30 through a plurality of openings 74. In some embodiments, each opening 74 may be configured as an orifice to produce some back pressure on the fuel within first anode distribution channel 68. The back pressure may promote the distribution of fuel within first anode distribution channel 68 thereby ensuring first anode distribution channel 68 is fully flooded with fuel. In some embodiments, fully flooding first anode distribution channel 68 enables fuel to be delivered to substantially all channels of anode flow field 30 through all of openings 74. Fully flooding first anode distribution channel 68 may prevent or reduce the risk of short circuiting the flow of fuel along a path of least resistance through anode flow field 30, which could reduce the performance of fuel cells 10 due to the reduction in active area being utilized. In some embodiments, orifice openings 74 may be sized to enable the minimum amount of back pressure needed to ensure fully flooding of first anode distribution channel 68. As illustrated in FIG. 6, second anode distribution channel 70 may be configured the same as first anode distribution channel 68 with a plurality of orifice shaped openings 74 fluidly connecting the channels of anode flow field 30 and second anode distribution channel 70. Openings 74 may have a smaller cross-sectional area than the corresponding channel in anode flow field 30. Channels in anode flow field 30, although shown as straight paths, may be wavy or zig-zag paths. Channels in anode flow field 30 have a cross-sectional area that is generally square, semi-circular, parabolic, or any other suitable shape.

Compression of fuel cells 10 during assembly and the compressed state maintained during operation may compromise the flow path integrity within distribution channels. For example, compression of fuel cells 10 may cause the volume of the distribution channels to decrease, which can restrict flow of fuel, oxidant, and coolant and increase pressure drop through fuel cells 10. To prevent or minimize shrinking or collapsing of first anode distribution channel 68 and second anode distribution channel 70 when fuel cell 10 is compressed, first anode distribution channel 68 and/or second anode distribution channel 70, in some embodiments, may include a plurality of support features 76 spread throughout the distribution channels. Support features 76 may be formed as integrated features of anode plate 22. Support features 76 may be evenly spaced throughout first anode distribution channel 68 and second anode distribution channel 70.

Figure 7A:
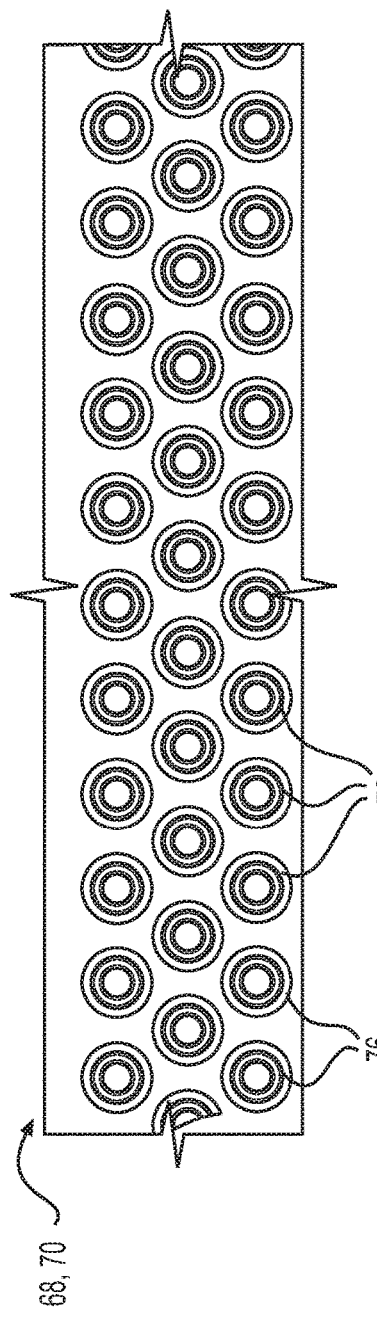
FIG. 7A is an enlarged view of portions of FIG. 6.
Figure 7B:
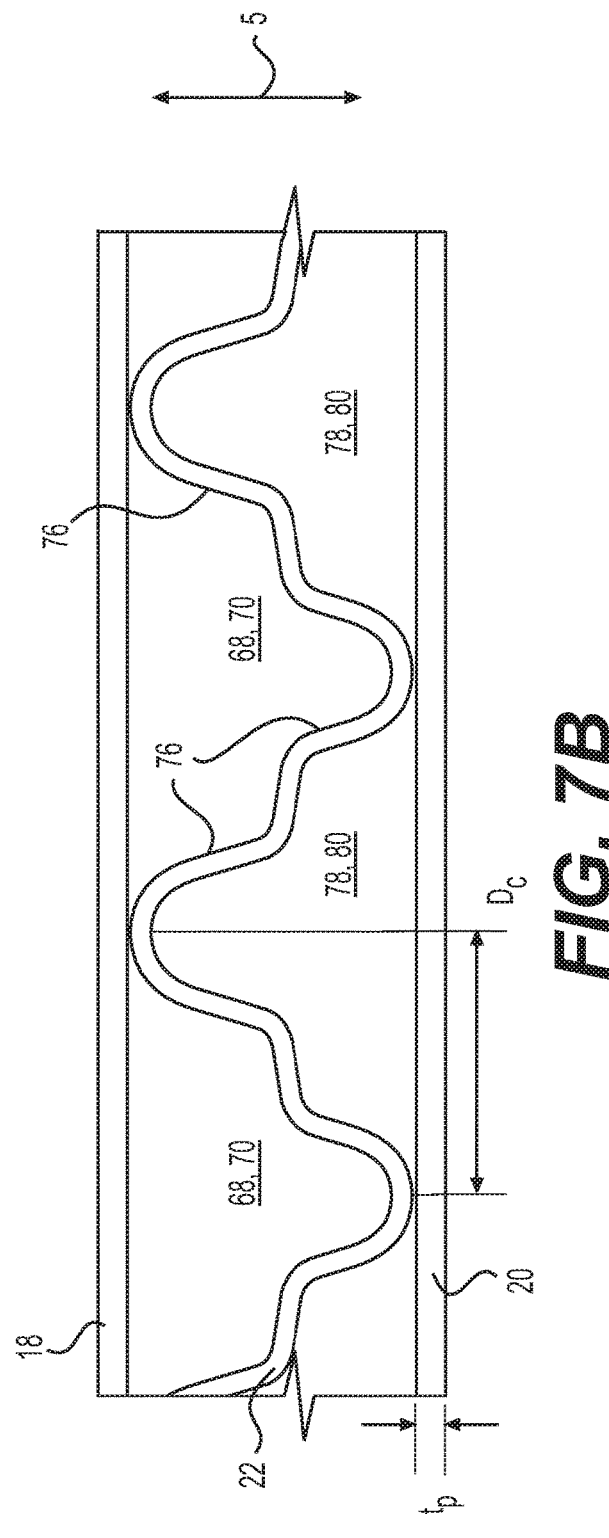
FIG. 7B is a cross-sectional schematic of a portion of a fuel cell, according to an exemplary embodiment.

In one illustrative embodiment, FIG. 7A shows an enlarged view of a portion of a plurality of dimple shaped support features 76 that may be formed in first anode distribution channel 68 and/or second anode distribution channel 70. These dimple shaped support features 76 can extend from anode plate 22 in both directions along longitudinal axis 5. For example, FIG. 7B shows a cross-sectional schematic of the dimple shaped support features 76 formed by anode plate 22. The dimple shaped support features 76 can extend from anode plate 22 in both directions to contact cathode plate 20 on one side and contact MEA 18 (e.g., subgaskets of MEA 18) on the other side. As shown in FIG. 7B, between anode plate 22 and MEA 18 may be the space that forms first anode distribution channel 68 or second anode distribution channel 70 and enables flow of fuel. In other embodiments, other support features may be formed in other shapes besides dimples, including for example, cone shaped, semi-spherical shaped, cube shaped, and cylinder shaped.

As shown in FIG. 7B, on the opposite side of anode plate 22, between anode plate 22 and cathode plate 20 may be the space that forms a first and second coolant distribution channels 78, 80 fluidly connecting coolant feed manifold 56, coolant discharge manifold 62 with a coolant flow field 86 contained with coolant compartment 23. First and second coolant distribution channels 78, 80 of coolant compartment 23 can be configured similar to first and second anode distribution channels 68, 70. For example, first and second coolant distribution channels 78, 80 may include a plurality of dimple shaped support features 76 evenly spaced throughout. First and second coolant distribution channels 78, 80 may be configured to provide full and uniform distribution to coolant flow field 86 (see e.g., FIG. 5). Additionally, in some embodiments, a plurality of orifice shaped openings may fluidly connect first and second coolant distribution channels 78, 80 with coolant flow field 86 (see FIG. 5). These orifice shaped openings may apply some back pressure on the coolant fluid, for example, in first and/or second coolant distribution channels 78, 80—depending on direction of flow—in order to ensure uniform distribution and prevent or reduce the likelihood of short circuiting along a path of least resistance.

The number, distribution, and size of the support features 76 may be determined by taking into account a variety of design considerations. For example, too many or too large support features 76 can lead to excessive pressure drop within distribution channels 68, 70, 78, 80 while too few or too small support features 76 can result in insufficient structural support and shrinking of distribution channels 68, 70, 78, 80 when under compression, which can also lead to excessive pressure drop. According to an exemplary embodiment, the arrangement of structural features can be expressed as a function of a distance ($D_C$) between support features 76 and a thickness ($t_p$) of cathode plate 20. For example, a ratio of $D_C/t_p$ can be greater than about 3, but less than about 50. According to an exemplary embodiment, $D_C$ can be about 1.5 mm and $t_p$ can be about 0.1 mm, therefore the ratio of $D_C/t_p$ can be about 15.

Due to the compression of fuel cells during operation, it can be challenging to maintain the integrity (e.g., prevent shrinking) of inlet and outlet ports flow area where gaskets are relied up to create or maintain the flow area. Shrinking of the inlet and outlet ports can restrict flow of reactants and reactant products and increase pressure drop through the fuel cells. The one or more anode inlet and outlet ports 36, 38 of fuel cell 10, as described herein, may be configured to prevent or avoid shrinking due to compression.

Anode inlet and outlet ports 36, 38 may be integrated into one or more support features 82. For example, as shown in FIGS. 8A and 8B anode inlet ports 36 may be formed in a side wall 84 of support feature 82. Support features 82 may extend from anode plate 22 toward MEA 18. As a result, the flow directions of fuel may be redirected within support features 82 so that the flow direction through anode inlet and outlet ports 36, 38 is generally parallel to anode plate 22. In other words, this configuration may enable fuel through anode inlet ports 36 to be directed into first anode distribution channel 68 in a direction generally parallel to anode plate 22 rather than perpendicular. Similarly, this configuration may enable fuel through anode outlet ports 38 to be directed from second anode distribution channel 70 in a direction generally parallel to anode plate 22 rather than perpendicular.

Such a configuration can prevent or avoid shrinking of the flow path through anode inlet and outlet ports 36, 38 because support feature 82 may be designed to withstand the compression during operation thereby generally maintaining the cross-sectional area for flow. In comparison, often prior art fuel cells rely on gaskets in order to maintain spacing for flow and under compression these gaskets compress thereby reducing the available area available for fluid flow causing an increase in pressure drop thereby by restricting flow.

Support features 82 may be any suitable shape. For example, in one illustrative embodiment as shown in FIG. 8A, support features 82 may be a generally rounded rectangular shape. In other embodiments, support features 82 may be circular, oval shaped, square shaped, etc. Support features 82 may each include one or more anode ports (e.g., anode inlet ports 36 and anode outlet ports 38). For example, in one illustrative embodiment as shown in FIG. 8A, support feature 82 may include five anode inlet ports 36 evenly spaced along a length of support features 82.

Figure 9:
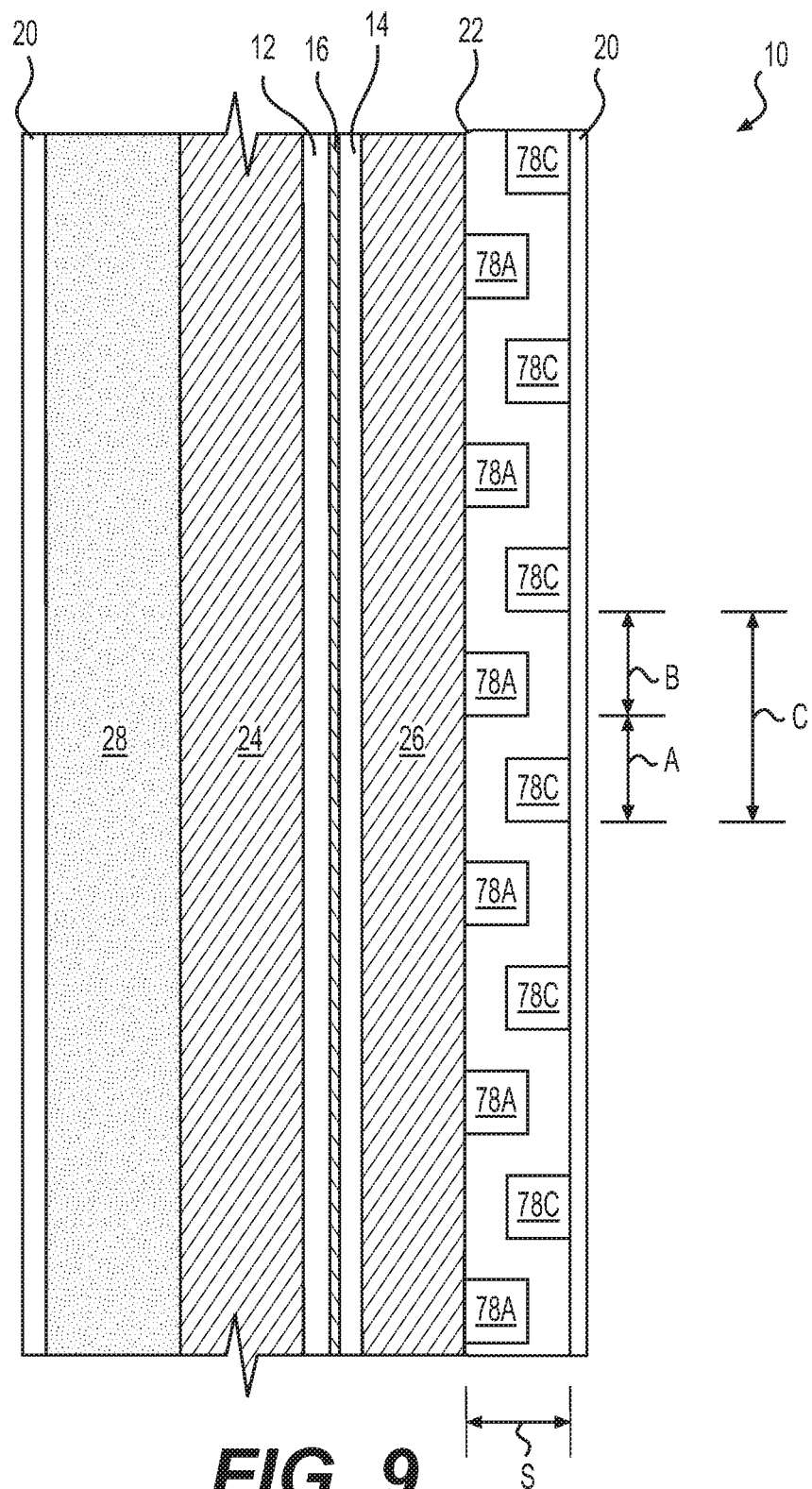
FIG. 9 is a cross-sectional schematic of a fuel cell, according to an exemplary embodiment.

Anode flow field 30 may be configured as a channel flow field that faces and aligns with the active area of anode catalyst layer 14 on the anode side of MEA 18. Anode flow field 30 may include a plurality of parallel channels that extend between first anode distribution channel 68 and second anode distribution channel 70, as shown in FIG. 6. FIG. 9 is a cross-sectional schematic top view of a portion of fuel cell 10. As shown in FIG. 9, anode plate 22 may be shaped to form a plurality of channels 78A, 78C, which may be generally square, semi-cylindrical or parabolic-shaped corrugated channels. Anode channels 78A, which may form anode flow field 30, may be open to anode compartment 21 and configured to direct the flow of fuel across GDL 26 so the fuel can flow through GDL 26 and reach anode catalyst layer 14. Coolant channels 78C, which may form coolant flow field 86, may be open to and part of coolant compartment 23 and configured to direct coolant fluid flow through coolant compartment 23 so heat generated by fuel cell 10 may be transferred to the coolant fluid and carried from fuel cell 10 by circulation of the coolant fluid.

The dimension of channels 78A, 78C may be determined based on numerous variables including for example, active area, power, compressive load on fuel cell 10, desired or designed flow resistance, anode and/or cathode plate thickness and material properties (e.g., elasticity), open flow field properties and/or thickness, gas diffusion layer properties and/or thickness, design flow resistance for the anode, cathode, and/or coolant fluid. In some embodiments, a width (A) of coolant channels 78C may be equal to a width (B) of anode side channels 78. In other embodiments, width (B) of anode channels 78A may be greater than or less than width (A) of coolant channels 78C. A combined width of an anode channel 78A and a coolant channel 78C may be referred to as (C). The anode channels and coolant channels may have a depth (S). According to an exemplary embodiment, the ratio of C/S may be greater than about 1 and less than about 10. Accordingly to an exemplary embodiment the ratio of A/B may range from between greater than about 1 to less than about 6 or greater than about 2 or less than about 4. These ratios may be determined based on a mechanical load due to compression ranging from about 10 kg/cm$^2$ to about 75 kg/cm$^2$.

The square corrugate channel design, as described herein, provides improved fluid flow while also minimizing fuel cell 10 thickness by integrating anode flow field 30 and coolant flow field 86 into alternating channels on opposite sides of anode plate 22. This integration enables the overall thickness (e.g., pitch) of fuel cell 10 to be reduced. In addition, the square corrugated geometry provides sufficient surface area contact between anode plate 22 and GDL 26 as well as cathode plate 20 to prevent deformation when under compression during operation. For example, if the channels are too narrow the small surface areas can act as stress concentrators and may deform or damage the adjacent components (e.g., GDL 26). Similarly, if the channels where triangle shaped corrugations the triangle points could create stress concentration points that could deform the adjacent components.

Figure 10:
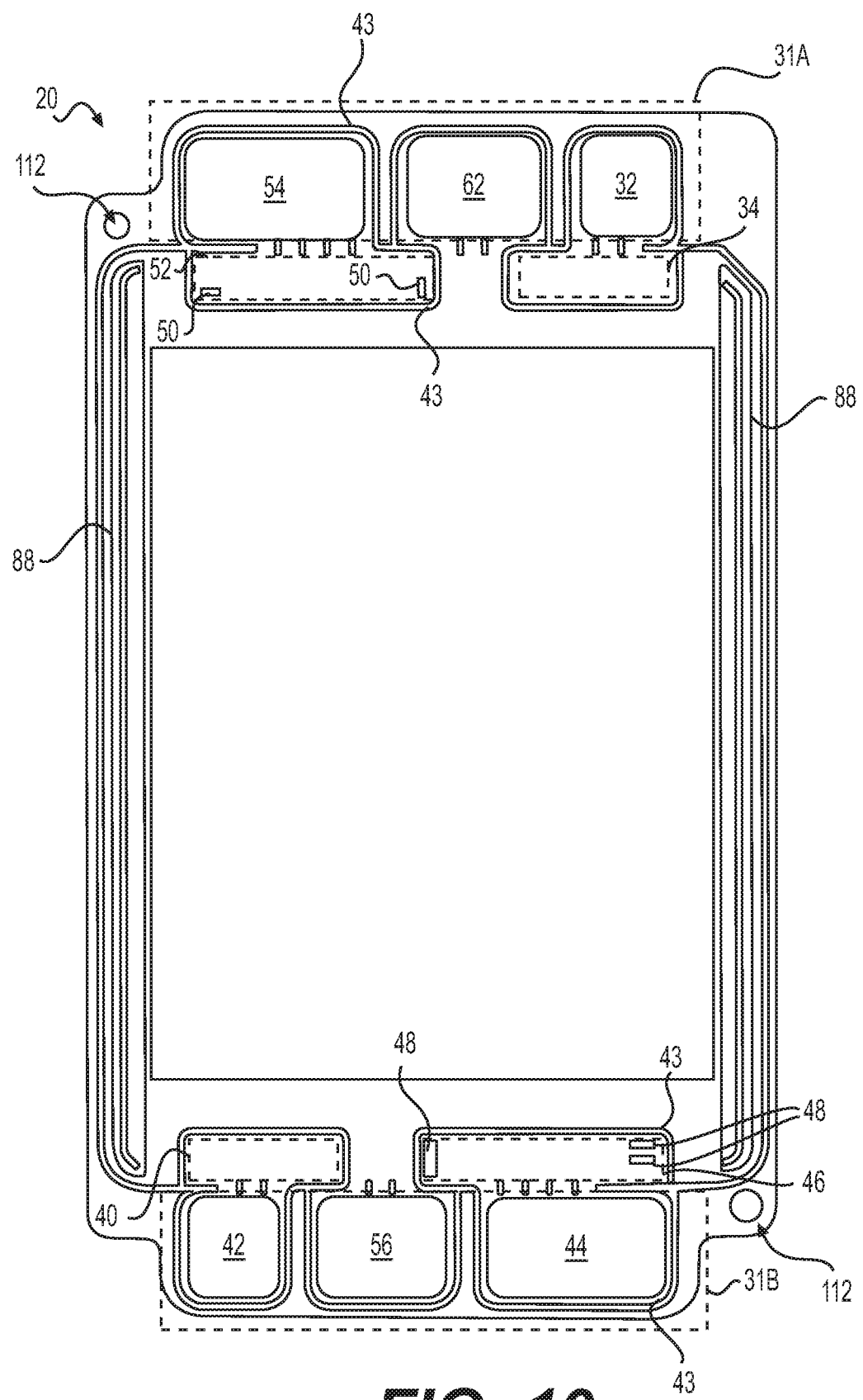
FIG. 10 is a front view of a cathode plate of FIG. 2, according to an exemplary embodiment.

FIG. 10 is a front view of cathode plate 20, according to exemplary embodiment. The side visible in FIG. 10 is the side configured to face adjacent anode plate 22 (see e.g., FIG. 2). Cathode plate 20 may include first manifold section 31A and a second manifold section 31B like anode plate 22. As shown in FIG. 10, anode plate 22 may include anode feed manifold 32, cathode discharge manifold 54, and coolant discharge manifold 62 in first manifold section 31A while second manifold section 31B may include anode discharge manifold 42, cathode feed manifold 44, and coolant feed manifold 56. It is to be understood, that the designations of "inlet" or "outlet" for each manifold may be switched, for example, by switching a flow direction of the fuel, the oxidant, or the coolant fluid through fuel cells 10.

Cathode plate 20 may include a plurality of cathode inlet ports 48 configured to fluidly connect cathode compartment 19 and cathode flow field 28 with cathode feed manifold 44 via a cathode inlet passage 46. Cathode plate 20 may also include a plurality of cathode outlet ports 50 configured to fluidly connect cathode compartment 19 and cathode flow field 28 with cathode discharge manifold 54 via a cathode outlet passage 52. Cathode inlet and outlet passages 46, 52 may be located between anode plate 22 and cathode plate 20 of adjacent fuel cells 10. Perimeters of cathode inlet and outlet passages 46, 52, as well as cathode feed and discharge manifolds 44, 54, may be sealed by surface gaskets 43, as illustrated in FIG. 10.

Cathode inlet and outlet ports 48, 50 may be generally rectangular shaped as illustrated in FIG. 10. Cathode plate 20 may be configured to have at least two cathode inlet ports 48 arranged generally perpendicular to one another, as illustrated in FIG. 10. Cathode plate 20 may be configured to have at least two cathode outlet ports 50 arranged generally perpendicular to one another, as illustrated in FIG. 10. Cathode plate 20 may be configured to have at least one cathode inlet port 48 positioned at opposite ends of cathode inlet passage 46. Cathode plate 20 may be configured to have at least one cathode outlet port 50 positioned at opposite ends of cathode outlet passage 52. Cathode plate may be configured to have two cathode inlet ports 48 positioned at one end of cathode inlet passage 46 and one cathode inlet port 48 positioned at the opposite end. The two cathode inlet ports 48 positioned at one end may be generally parallel to one another and generally perpendicular to the cathode inlet passage 46 positioned at the opposite end of cathode inlet passage 46. The shape and arrangement of cathode inlet ports 48, as described herein, may promote improved distribution of the oxidant as it flows into cathode compartment 19.

Rectangular shaped cathode inlet ports 48 may be advantageous over round shaped ports because the flow through the ports turns 90 degrees immediately after passing through the ports. The greater the perimeter of the hole relative to its area, the more "spill length" the fluid has and therefore the lower its velocity (and pressure drop) as it makes the turn. The net result is that for two holes, one round and one rectangular, with the same cross-sectional area, the pressure drop in this application is lower for the rectangular port than for a round port. The orientation of the rectangle, with the long edge generally facing the incoming fluid flow, may also result in greater "spill length" and lower pressure drop.

The total inlet area of the plurality of cathode inlet ports 48 may be greater than a total outlet area of the cathode outlet ports 50. Cathode outlet ports 50 having a total outlet area less than the total inlet area can produce a back pressure on oxidant flow through cathode compartment 19 and cathode flow field 28. Such back pressure may promote improved distribution of oxidant across the cathode compartment.

As shown in FIG. 10, cathode plate 20 may include surface features, for example, cathode flow field borders 88 that protrude out from cathode plate 20 toward MEA 18 along the sides of cathode flow field 28 (see e.g., FIG. 2). As shown in FIG. 10, cathode flow field borders 88 may span between first fluid manifolds 31A and second fluid manifolds 31B along opposite sides of cathode plate 20. Cathode flow field borders 88 may be configured to prevent or reduce the amount of flow of oxidant bypassing cathode flow field 28 and cathode catalyst layer 12 by flowing along the outside of cathode flow field 28 rather than flowing through cathode flow field 28 to cathode catalyst layer 12. For example, cathode flow field borders 88 can act as border walls on each side of cathode flow field 28 thereby forcing oxidant flow through cathode flow field 28. Cathode plate 20 may be configured so that a distance between cathode flow field borders 88 is about equal to a width of cathode flow field 28. Cathode flow field borders 88 may be configured to protrude from cathode plate 20 a depth equal to a depth of cathode flow field 28. Cathode flow field borders 88 may be generally rectangular shaped with rounded or chamfered outer corners, as shown in FIG. 10. Cathode flow field borders 88 may be positioned to provide a tight-fit along the edges of cathode flow field 28 in order to prevent or limit any open flow area for fluid to "run along" the perimeter length of cathode flow field 28. In some embodiments, cathode flow field borders 88 may be formed by cathode plate 20 or in some embodiments cathode flow field borders 88 may be formed by applying a second material to cathode plate 20 (e.g., a polymer, elastomer, surface gaskets 43 material bonded to the plate in the shape of cathode flow field borders 88).

In some embodiments, rather than apply surface gaskets 43 to both the cathode plate 20 and anode plate 22, all the surface gaskets 43 described herein may be applied to either side of cathode plate 20, which may be generally flat. By consolidating all the surface gaskets 43 on just cathode plate 20, which can be flat, this can reduce both tooling cost and processing cost. For example, because anode plate 22 has channels 78A, 78C, making it not generally flat, applying a surface gasket to anode plate 22 is more complex, thereby increasing the tooling and processing cost.

To further reduce the tooling and processing cost, in some embodiments, alignment features 112 (see e.g. FIGS. 6 and 10) may be incorporated in the surface gaskets to facilitate assembling each fuel cell 10 as well as alignment of a plurality of fuel cells 10 into fuel cell stack 11. For example, the alignment features 112 of anode plate 22 (see FIG. 6) may be holes that aligns with surface gasket protrusions, which may be alignment feature 112 of cathode plate 20 (see FIG. 10). The protrusions may elastically deform upon insertion through the holes of anode plate 22 and recover on the other side, thereby forming an interference fit. Utilizing interference fits to assemble the cell 10 and stack 11 can avoid the need for some welding operations in the assembly process.

Figure 11A:
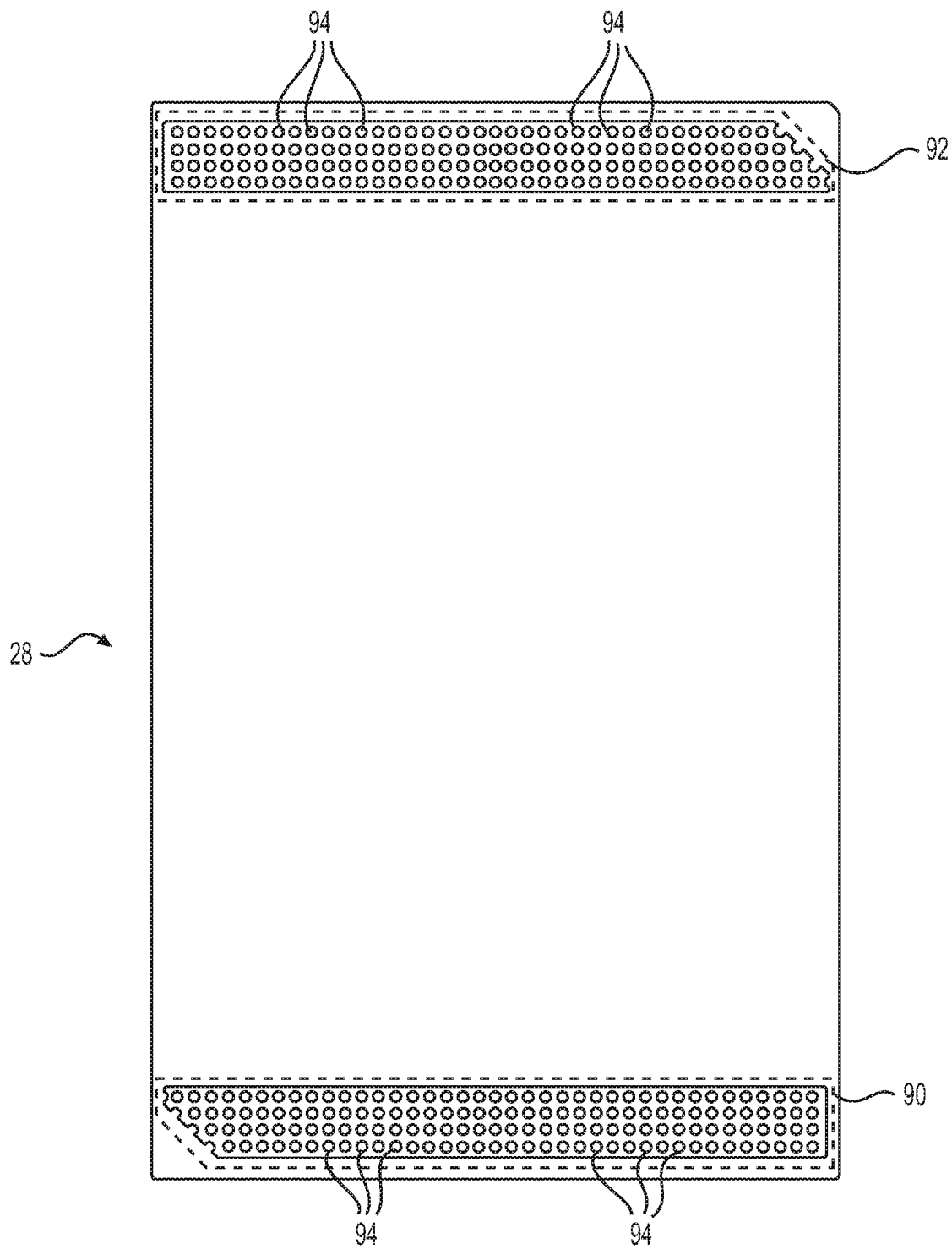
FIG. 11A is a front view of a cathode flow field of FIG. 2, according to an exemplary embodiment.

FIG. 11A is a front view of cathode flow field 28, according to exemplary embodiment. The side visible in FIG. 11A is the side configured to face adjacent cathode plate 20 (see, e.g., FIG. 2). Cathode flow field 28 may comprise a porous structure, in particular a porous metallic foam structure having a porous three-dimensional network structure. The porous structure may be sheet-shaped with two opposing surfaces. In some embodiments, the porous metallic foam structure may have an average pore size of about 50 to 500 µm. Cathode flow field 28 may include a first cathode distribution channel 90 and a second cathode distribution channel 92 recessed into the surface of the porous metallic foam structure facing cathode plate 20. Cathode flow field 28 may have a thickness of for example, about 0.2 mm to about 1.5 mm. First cathode distribution channel 90 and/or second cathode distribution channel 92 may be recessed into cathode flow field a depth of between about 10% and about 75% of the thickness.

First cathode distribution channel 90 may extend generally from one side of cathode flow field 28 to the other side along a bottom edge of cathode flow field 28. Second cathode distribution channel 92 may extend generally from one side of cathode flow field 28 to the other side along a top edge of cathode flow field 28. When cathode flow field 28 is positioned adjacent cathode plate 20, cathode inlet ports 48 may be aligned with first cathode distribution channel 90 and cathode outlet ports 50 may be aligned with second cathode distribution channel 92.

Cathode flow field 28 may include a plurality of support features 94 formed throughout first cathode distribution channel 90 and/or second cathode distribution channel 92. Support features 94 may be generally cylindrical, dimple shaped, or other suitable shape. A height of one or more support features 94 may be about equal to the recess depth of first cathode distribution channel 90 and/or second cathode distribution channel 92. First cathode distribution channel 90, second cathode distribution channel 92, and support features 94 may be formed by stamping, rolling or otherwise plastically deforming the porous metallic foam structure forming cathode flow field 28.

First cathode distribution channel 90 and second cathode distribution channel 92 may be configured to promote uniform flow distribution of oxidant along a width of cathode flow field 28 by providing an open flow path for the oxidant to flow along before flowing into the pores of the porous metallic foam structure. Support features 94 may be configured to provide adequate support during mechanical compression and also during operation to maintain the open flow path provided by first cathode distribution channel 90 and second cathode distribution channel 92 when fuel cell 10 is compressed by preventing or reducing deformation or deflection of cathode plate 20 into first cathode distribution channel 90 and second cathode distribution channel 92.

Figure 11B:
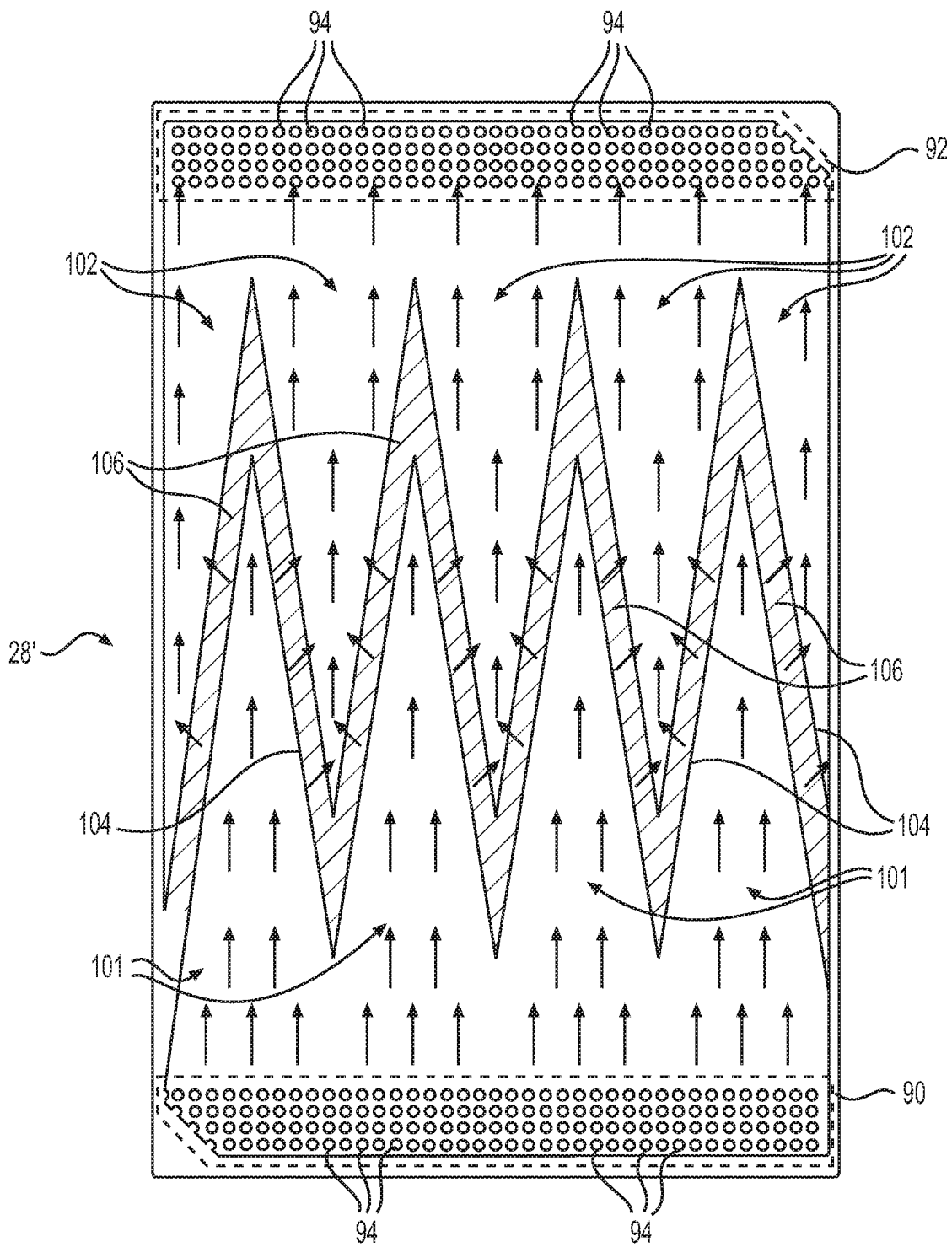
FIG. 11B is a front view of another embodiment of a cathode flow field, according to an exemplary embodiment.
Figure 11C:
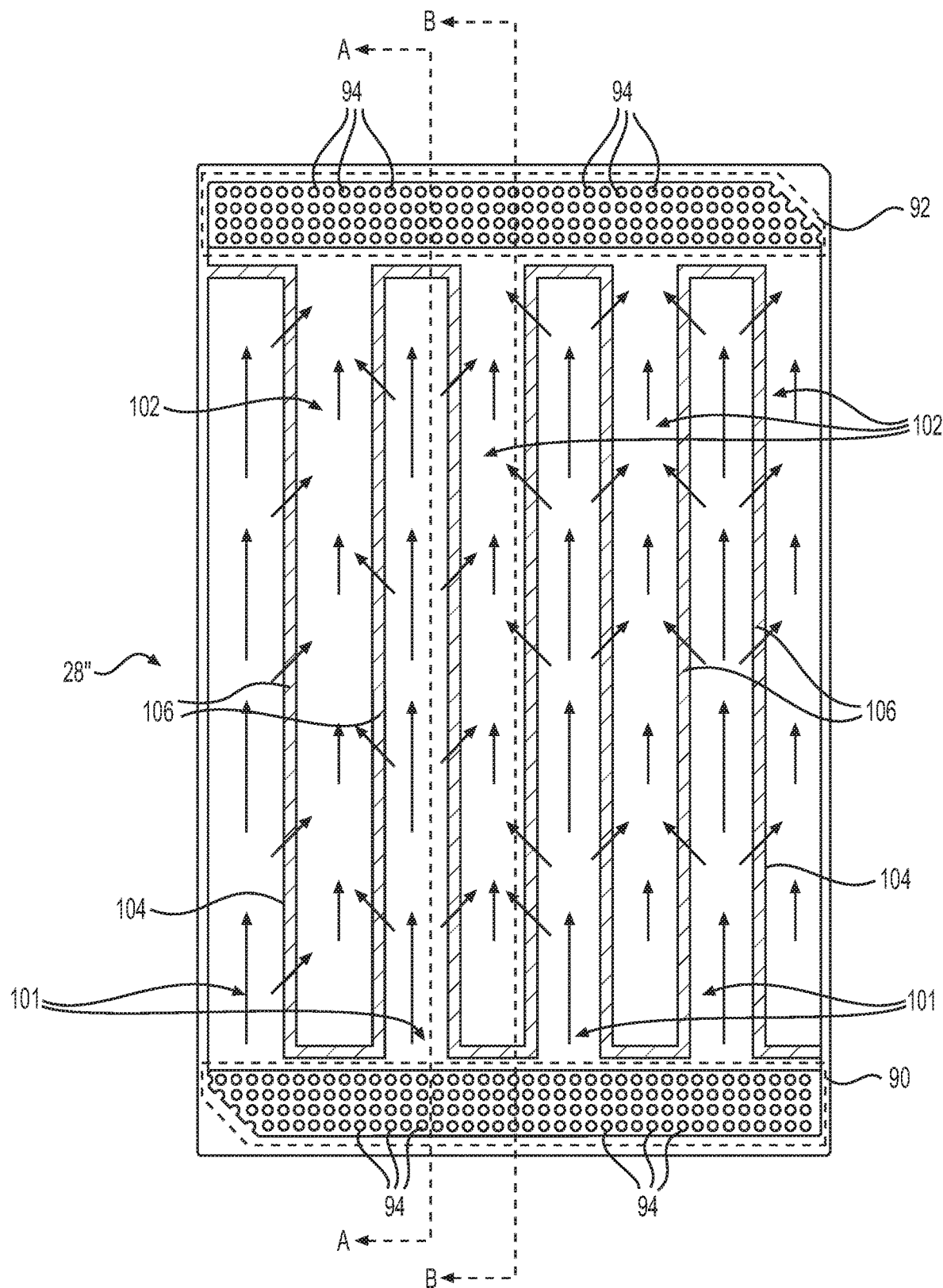
FIG. 11C is a front view of another embodiment of a cathode flow field, according to an exemplary embodiment.
Figure 11D:
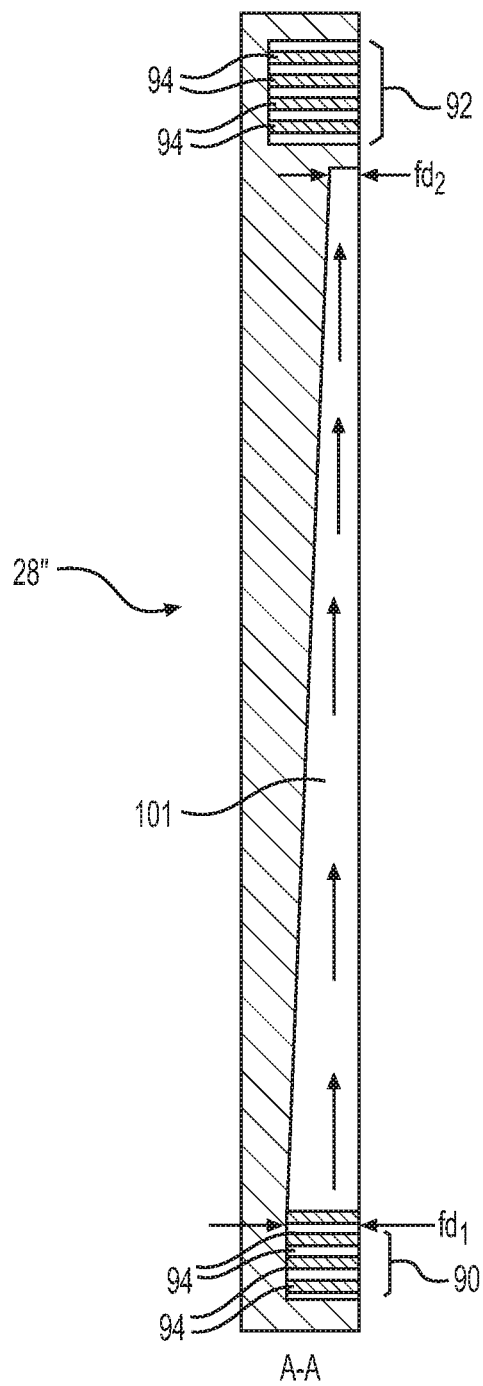
FIG. 11D is a cross-sectional view along cross-section A-A of FIG. 11C, according to an exemplary embodiment.
Figure 11E:
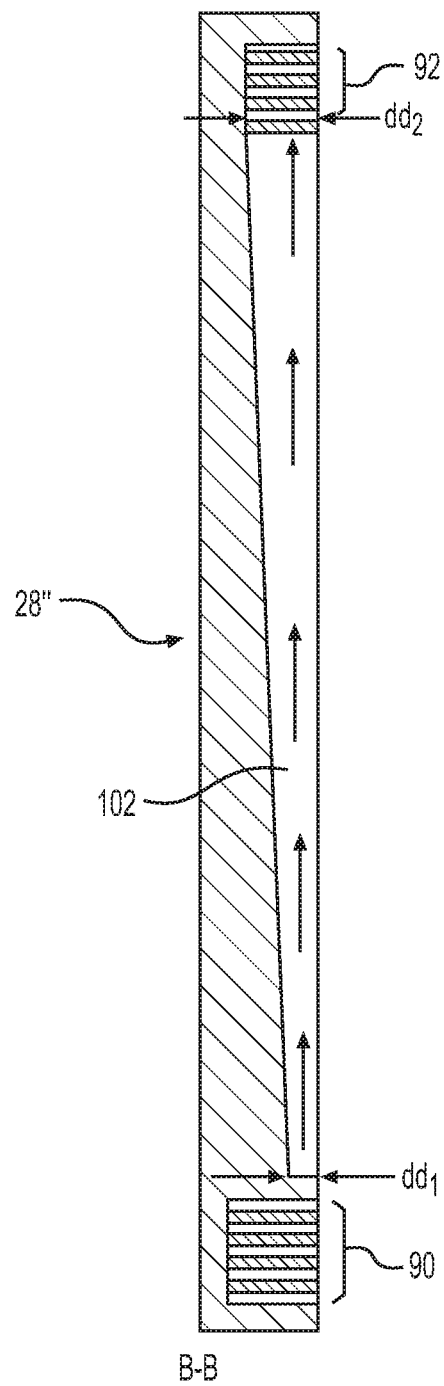
FIG. 11E is a cross-sectional view along cross-section B-B of FIG. 11C, according to an exemplary embodiment.
Figure 11F:
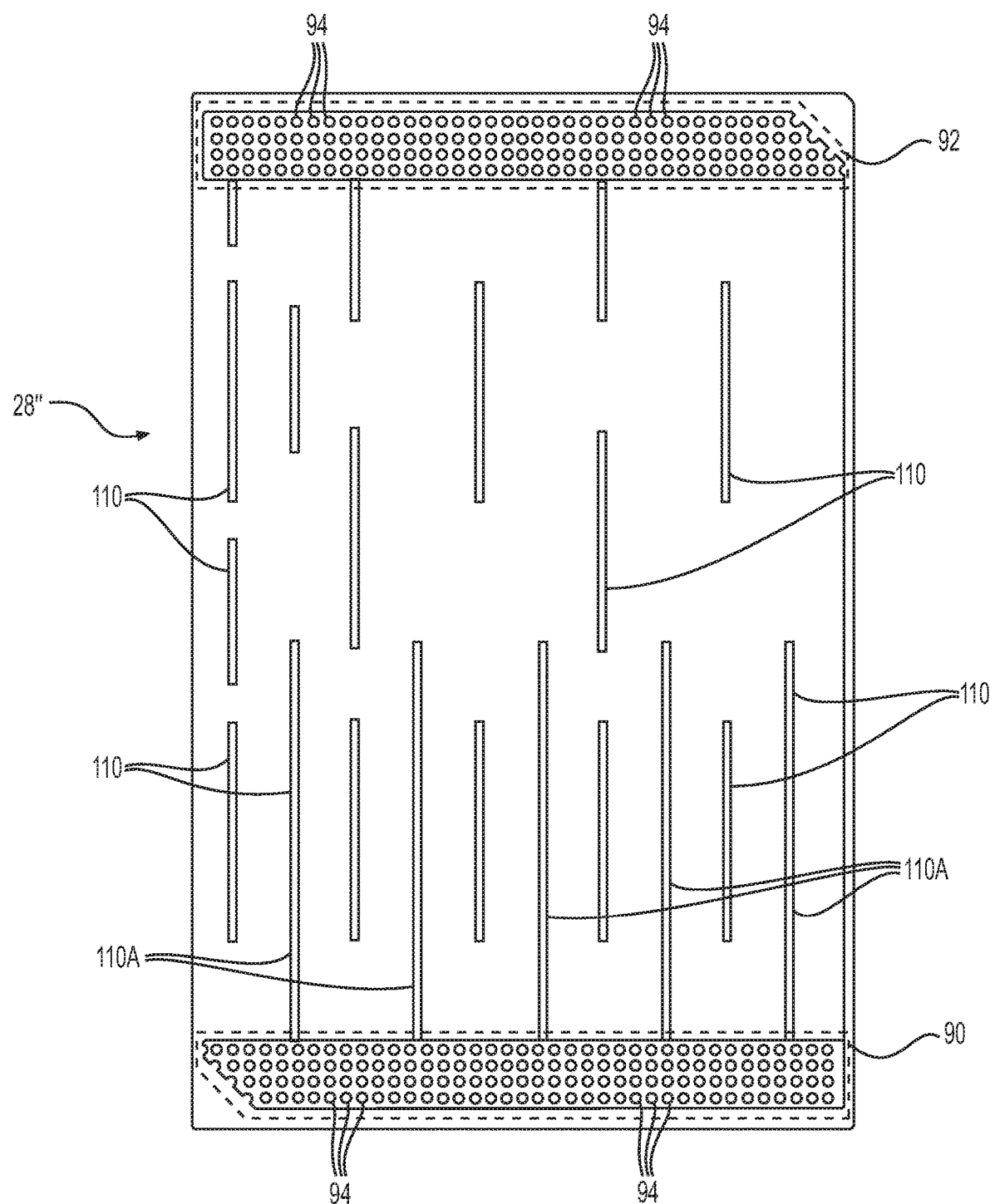
FIG. 11F is a front view of another embodiment of a cathode flow field, according to an exemplary embodiment.

FIGS. 11B, 11C, and 11F are front views of additional embodiments of cathode flow fields 28', 28'', 28'''. In some embodiments, cathode flow fields 28', 28'', 28''' may be utilized in fuel cell 10 in place of cathode flow field 28. Cathode flow fields 28', 28'', 28''' may include all the features of cathode flow field 28, as described herein, as well as the additional features as will be described below. The side visible in FIGS. 11B, 11C, and 11F may be the side configured to face adjacent cathode plate 20 or the side configured to face adjacent MEA 18.

Cathode flow fields 28', 28" may include a plurality of feed (or first) channels 101 and a plurality of discharge (or second) channels 102. Feed channels 101 and discharge channels 102 may be stamped, cut, molded, or otherwise formed in cathode flow field 28' on the surface facing cathode plate 20. As shown in FIGS. 11B and 11C, feed channels 101 may start at and be in fluid communication with first cathode distribution channel 90 and extend toward second cathode distribution channel 92. Discharge channels 102 may end at and be in fluid communication with second cathode distribution channel 92 and extend toward first cathode distribution channel 90. Feed channels 101 and discharge channels 102 may be interdigitated, as shown in FIG. 11B such that discharge channels 102 may be positioned between adjacent feed channels 101. In some embodiments, feed channels 101 and discharge channels 102 may be substantially free of obstructions to fluid flow to enable improved oxidant distribution. In some embodiments, feed channels 101 and discharge channels 102 may include dimples (not shown) similar to dimples 94 found in first and second cathode distribution channels 90, 92.

It is contemplated that, in certain embodiments, the plurality of feed channels 101 and discharge channels 102 may have different arrangements, shapes and/or cross-sectional areas. For example, in FIG. 11B the width of feed and discharge channels 101, 102 may vary along the length of cathode flow field 28'. In FIG. 11B the feed channels 101 start wide at or near first cathode distribution channel 90 and narrow to a point extending toward second cathode distribution channel 92 while the discharge channels start at a point and widen extending toward second cathode distribution channel 92. In some embodiments, the distal ends of the feed channels 101 may be flat rather than a point as shown in FIG. 11B. Similarly, in some embodiments the proximal ends of the discharge channels 102 may be flat rather than a point as shown in FIG. 11B. With this arrangement, there is not direct fluid communication between the feed channels 101 and discharge channels 102. Rather, oxidant distributed by first cathode distribution channel 90 to the feed channels 101 may flow through the plurality of feed channels 101 and may be forced to diffuse through the porous structure of cathode flow field 28' to adjacent discharge channels 102.

FIG. 11C shows another arrangement of feed channels 101 and discharge channels 102 for cathode flow field 28" in which the width of feed and discharge channels 101, 102 remain about the same along the length of cathode flow field 28". Although, the width of feed and discharge channels 101, 102 remain about the same, a depth of feed and discharge channels 101, 102 may vary along the length of cathode flow field 28". For example, FIG. 11D shows a cross-section of cathode flow field 28" along cross-section A-A through a feed channel 101. As shown in FIG. 11D, feed channels 101 may start deepest (i.e., maximum depth $fd_1$) at or near first cathode distribution channel 90 and the depth may decrease extending toward second cathode distribution channel 92. As shown in FIG. 11D, the depth may decrease at a constant rate (e.g., linearly) or in some embodiments, the depth may decrease at a variable rate (e.g., non-linearly, exponentially). As shown in FIG. 11D, feed channels 101 may dead end flat at the distal end with a minimum depth ($fd_2$). In other embodiments, feed channels 101 may dead end at the distal end with a zero minimum depth $fd_2$.

FIG. 11E shows a cross-section of cathode flow field 28" along cross-section B-B through a discharge channel 102. As shown in FIG. 11E, discharge channels 102 may start shallowest (i.e., minimum depth $dd_1$) at or near first cathode distribution channel 90 and the depth may increase extending toward second cathode distribution channel 92. Discharge channels 102 may be deepest (i.e., maximum depth $dd_2$) at or near second cathode distribution channel 92. As shown in FIG. 11E, the depth may increase at a constant rate (e.g., linearly) or in some embodiments, the depth may increase at a variable rate (e.g., non-linearly, exponentially). As shown in FIG. 11E, discharge channels 102 may start flat at the proximal end with minimum depth ($dd_1$). In other embodiments, discharge channels 101 may start at the proximal end with a zero minimum depth $dd_1$.

By varying the width (e.g., see FIG. 11B) or varying the depth (e.g., see FIGS. 11C-E) of feed and discharge channels 101, 102 the cross-sectional area available for flow of oxidant along cathode flow fields 28', 28" may vary (e.g., increase in discharge channels 102 or decrease in feed channels 101). The increase or decrease in the available flow area in feed and discharge channels 101, 102 along the length of cathode flow fields 28', 28" may be configured to correspond with the volume of oxidant that has diffused from feed channels 101 into the porous structure and diffused from the porous structure into discharge channels 102, such that the flow velocity of oxidant along the feed channels 101 and discharge channels 102 remains about constant. In other words, the cross-sectional area of feed channels 101 may decrease at a rate equal to the rate at which oxidant flows out of the feed channels 101 and diffuses into the porous structure so that the velocity of oxidant remains about constant. Similarly, the cross-sectional area of discharge channels 102 may increase at a rate equal to the rate at which oxidant flows out of the porous structure into the discharge channels 102 so that the velocity of oxidant remains about constant. In some embodiments, the width and depth of feed and discharge channels 101, 102 may both vary. For example, in some embodiments, FIGS. 11D and E may represent cross-sections of FIG. 11B in addition to FIG. 11C.

As shown in FIGS. 11B and 11C, there may be separating sections formed between feed channels 101 and discharge channels 102, which may be referred to as land sections 104. A thickness of the land sections 104 between feed channels 101 and discharge channels 102 may be fixed or in some embodiments the thickness may vary. For example, the thickness may be greatest closest to first cathode distribution channel 90 (e.g., between the proximal end of the feed channels 101 and distal end of the discharge channels) and the thickness may decrease towards the second cathode distribution channel 92. In other embodiments, the thickness may be thinnest closest to the first cathode distribution channel 90 and the thickness may increase towards the second cathode distribution channel 92. In other embodiments, the thickness of land sections 104 may be thickest or thinnest about midway between the first cathode distribution channel 90 and the second cathode distribution channel 92.

In some embodiments, a plurality of micro channels 106 may be formed in cathode flow fields 28', 28" in land sections 104. Micro channels 106 may be formed along the entire length or just a portion of land sections 104. Micro channels 106 may be configured to fluidly connect feed channels 101 with discharge channels 102 in order to create a preferred flow path for oxidant compared to the porous network provided by cathode flow fields 28', 28". For these embodiments, in conjunction with diffusing or rather than diffusing, oxidant may flow through the micro channels from feed channels 101 to discharge channels 102. The micro channels 106 may be sized and spaced in such a way to provide oxidant availability to a majority of catalyst sites that would otherwise be shadowed by the land sections of cathode flow fields 28', 28".

The number of feed and discharge channels 101, 102 may be adjusted based on one or more different parameters, including for example, a width of cathode flow fields 28', 28", a width of feed channels 101, a width of discharge channels 102, the application of fuel cell 10, the intended or designed operating pressure for the oxidant, the intended or designed operating flow rate for the oxidant, the intended or designed power output for fuel cell 10, or any combination of these parameters.

Cathode flow fields 28', 28" may present a number of benefits. For example feed channels 101 and discharge channels 102 provide a larger cross-sectional area through which the oxidant can flow, which can reduce the pressure drop across the porous flow field compared to other porous flow field structures. In addition, to the feed channels 101 and discharge channels 102, the micro channels may also provide an increased cross-sectional area through which the oxidant gas can flow between the feed channels 101 and discharge channels 102, which can further reduce the pressure drop across the porous flow field. By reducing the pressure drop the amount of energy required to pressurize the oxidant (e.g., blower power) may be reduced, which, in turn, can improve the overall performance and efficiency (e.g., improve power density and reduce parasitic loading) of fuel cell 10. In addition, the features of cathode flow fields 28', 28" may more uniformly distribute fresh oxidant within the porous flow field in order to increase the oxygen concentration near the outlet of the cathode flow field. (e.g., feed channels 101, discharge channels 102, and micro channels). This can enable the incoming flow of oxidant to remain, for example, oxygen rich until the flow is distributed through the porous body, which can result in better cell voltage and potentially higher current density.

Cathode flow field, as shown in FIG. 11F, may include a plurality of channels 110 formed (e.g., pressed, embossed, or cut) into the surface of cathode flow field 28'''. The plurality of channels 110 may include a first set of channels 110A that begin at first cathode distribution channel 90 and extend about halfway toward second cathode distribution channel 92. The first set of channels 110A are configured to enable fresh oxidant (e.g., not yet consumed) to travel directly to the second half of the cathode flow field 28''' where oxidant can often have lower oxygen concentrations. The first set of channels 110A may be dimensioned such that they sit on top of a land. The other channels 110 may be configured to reduce overall pressure drop and facilitate mixing and/or uniform distribution. For some embodiments, the stock material used for cathode flow field 28''' may come with non-uniformity that would result in non-uniform pressure drop and flow characteristics. Channels 110 are designed to help address this issue by enabling more uniform pressure drop and flow characteristics. The first set of channels 110A, also help reduce flowrate and thus flow velocity at the leading edge of the active area, which in turn reduces the removal of moisture in that region, providing better operation and performance in dry conditions. This also helps balance the humidity and oxygen concentration distribution along the flow path of cathode flow field 28''', which as a result of the electrochemical reactions, balances current and temperature distribution across the active area. This improves the durability and reliability of the fuel cells and stack. In some embodiments, first set of channels 110A may be positioned opposite any flow channels on the anode or coolant side of the fuel cell to avoid the potential for the high velocity effect to constructively interfere and increase the risk of the cell potentially drying out.

The porous structure making up cathode flow field 28 may include one or more metals and/or alloys. For example, the porous structure may include a combination of at least nickel (Ni) and chromium (Cr) (e.g., NiCr) or nickel, tin (Sn), and chromium (e.g., NiSnCr). For NiCr embodiments of the porous structure the concentrate by mass of chromium can range from about 20% to about 40% while nickel may make up the remaining balance—about 60% to about 80%. For NiSnCr embodiments of the porous structure the concentration of chromium can range from about 3% to about 6%, the concentration of tin can range from about 10% to about 20% while nickel may make up the balance—about 74% to about 87%.

In some embodiments, at least one surface of the porous structure may include a chromium concentration ranging from about 3% to about 50% by mass. For example, the chromium concentration of one or both surfaces of the porous structure that forms cathode flow field 28 may range from about 3% to about 50%, about 5% to about 40%, or from about 7% to about 40% by mass. Increasing the chromium concentration of the surface of the porous metal body may be advantageous because it increases the corrosion resistance of the porous structure in acidic environments. For example, when at least one of the surfaces of the porous structure forming the cathode flow field has a chromium concentration ranging from about 3% to about 50% by mass, the bipolar plate including the porous structure may be advantageously corrosion resistant in the substantially acidic environment at the cathode. The improved corrosion resistance provided by the porous structure as described herein may advantageously enable the cathode plate to be formed of uncoated stainless steel rather than coated stainless steel, which has been traditionally used because of its corrosion resistance properties.

In some embodiments, one surface of the porous structure may have a higher chromium concentration than the other surface of the porous structure. In such instances, the surface having the higher chromium concentration may advantageously be more corrosion resistant. The surface having the higher chromium concentration may be arranged to face MEA 18. In some embodiments, the more corrosion-resistant surface of the porous structure may have a chromium concentration ranging from about 3% to about 50% by mass while the less corrosion-resistance surface of the metal porous structure may have a chromium concentration of less than about 3% chromium by mass.

The various embodiments of the porous structure described herein may be formed by one or more electroplating processes. For example, in some embodiments, a resin-molded body may initially be used as a substrate for the three-dimensional network structure. The resin-molded body may include one or more of polyurethane, melamine, polypropylene, polyethylene, or the like. The resin-molded body may include pores in its three-dimensional network structure. In some embodiments, the resin-molded body may have a porosity ranging from about 80% to about 98% and may have a pore size of about 50 μm to about 500 μm. In some embodiments, the resin molded body may have a thickness of about 150 μm to about 5,000 μm, about 200 μm to 2,000 μm, or about 300 μm to about 1,200 μm.

To form the porous structure, metal layers may be plated onto the resin-molded body. For the NiCr embodiments of the porous structure, for example, a nickel layer and a chromium layer may be plated onto the resin-molded body. For the NiSnCr embodiments of the porous structure, for example, a nickel layer, a tin layer, and a chromium layer may be plated onto the resin-molded body. The resin-molded body may be subjected to electrical conduction treatment, such as electroless plating (auto-catalytic plating), vapor deposition, sputtering, and/or application of a conductive metal, such as nickel particles, tin particles, and/or carbon particles. Then, a nickel layer and/or a tin layer may be electrically plated on the surface of the three-dimensional structure or the skeletons of the treated resin-molded body. For example, when the resin molded body is coated with a conductive layer, a nickel layer may be subsequently formed on the skeletons of the resin-molded body through an electroplating process. After a nickel layer is formed, a tin layer may be subsequently formed on the skeletons of the resin-molded body through another electroplating process. Alternatively, when the resin-molded body is coated with a conductive layer, a tin layer may be electroplated first, followed by the electroplating of a nickel layer. In some embodiments, chemical vapor deposition may be used to add chromium to a substantially nickel structure.

In some embodiments, after one or more metal layers are plated onto the skeletons of the resin-molded body, such as a nickel layer and/or a tin layer, a chromium layer may be added through an electroplating process. In some embodiments, the chromium plating layer may be formed such that the chromium concentration of at least one surface of the porous structure ranges from about 3% to about 50% by mass. After the chromium plating layer has been plated or after the nickel and/or tin plating layers are plated, the porous structure may be formed by removing the initial resin-molded body by heat treatment. For example, the porous structure may be heated in an inert atmosphere or a reduced atmosphere at a temperature in the range from about 900° C. to about 1300° C.

Figure 12:
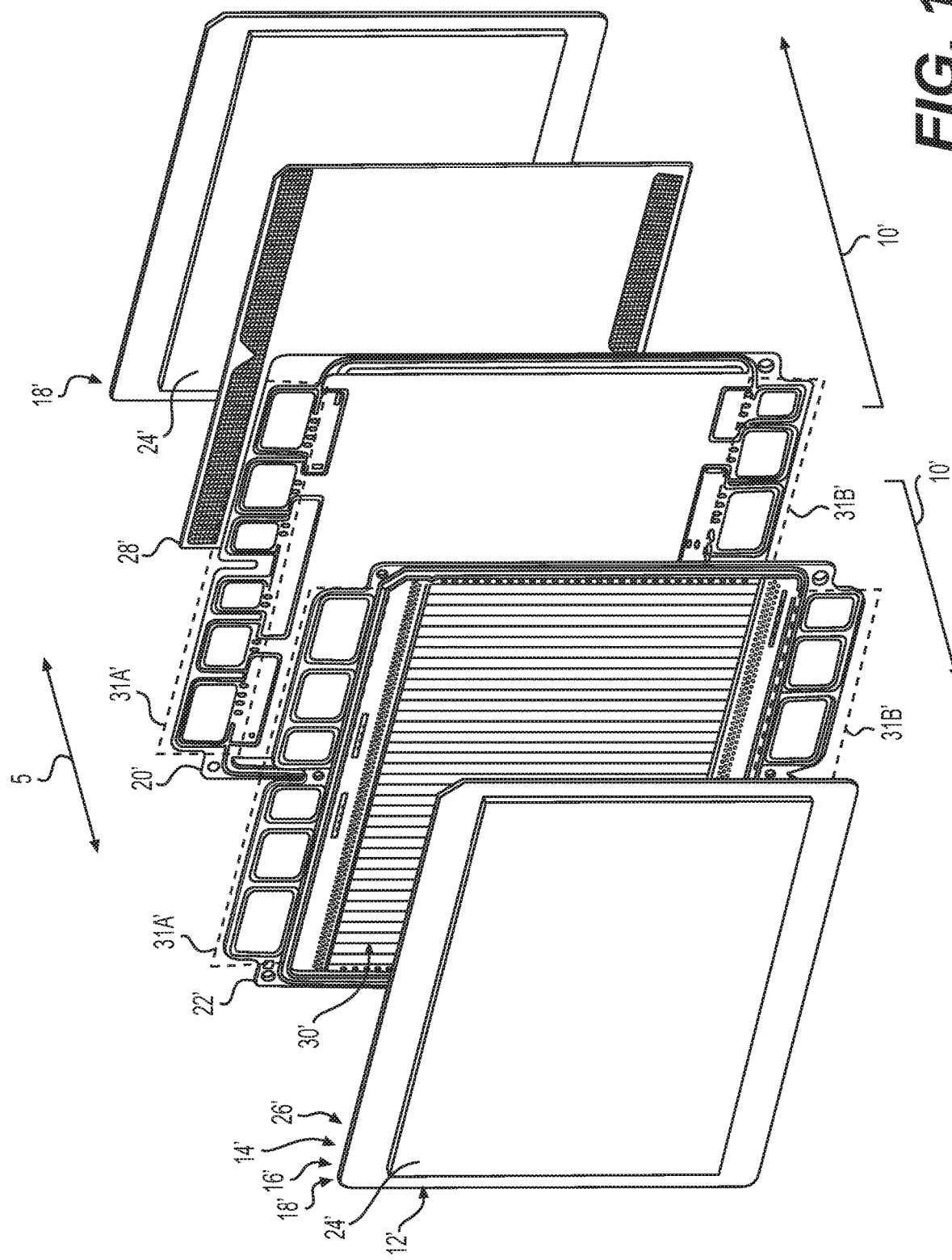
FIG. 12 is a side perspective view of portions of adjacent fuel cells, according to an exemplary embodiment.

In some embodiments, fuel cells 10 as described herein may be modified to increase the active area of each fuel cell 10. For example, fuel cells 10 may be modified such that the active area is doubled by doubling the width of the active area. FIG. 12 shows a side perspective view of portions of adjacent fuel cells 10' in which the active area may be double (2×) the size of the active area of fuel cells 10 (see e.g., FIG. 2). Fuel cells 10' may be laid out such that a left half of fuel cells 10' may be laid out the same as fuel cells 10 while a right half of fuel cells 10' may be laid out as a reflection of the left half along a bisecting line between the two halves. In some embodiments, left half and right have may be laid out the same rather than a reflection. Fuel cells 10' may include the same elements as fuel cells 10, as described herein, except the width is wider and the left and right halves are laid out as a reflection.

Figure 13:
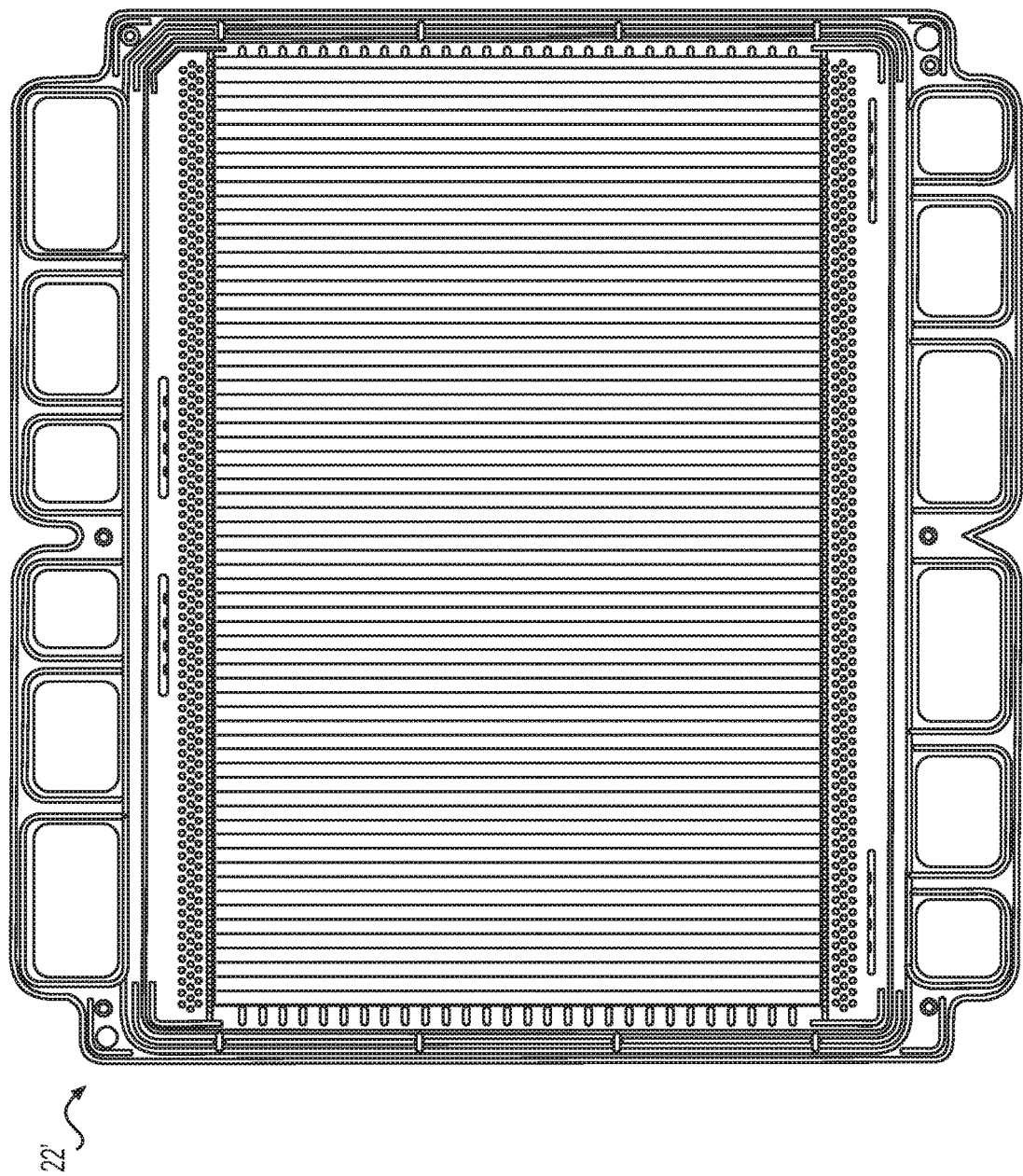
FIG. 13 is a front view of an anode plate of FIG. 12, according to an exemplary embodiment.
Figure 14:
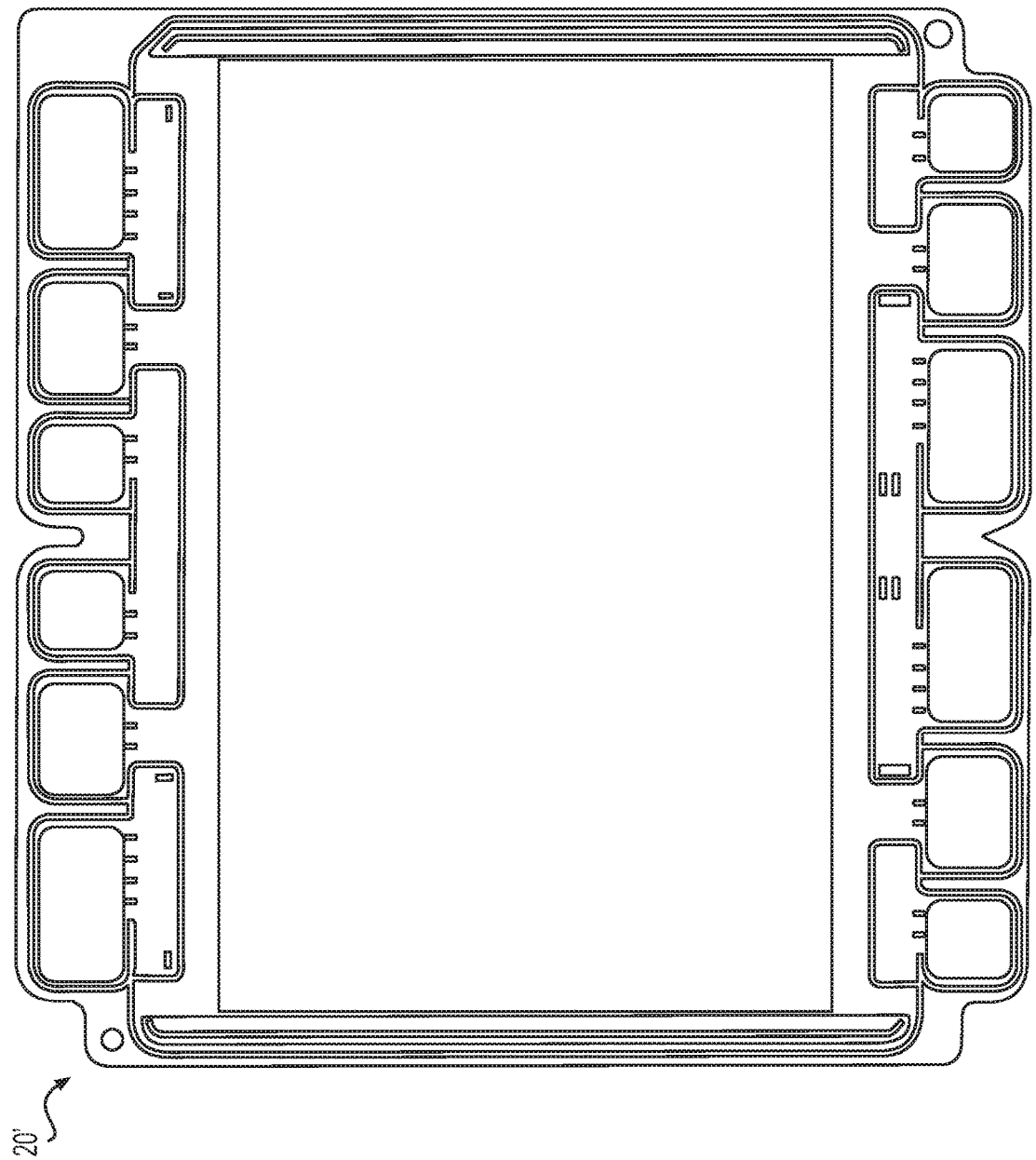
FIG. 14 is a front view of a cathode plate of FIG. 12, according to an exemplary embodiment.
Figure 15:
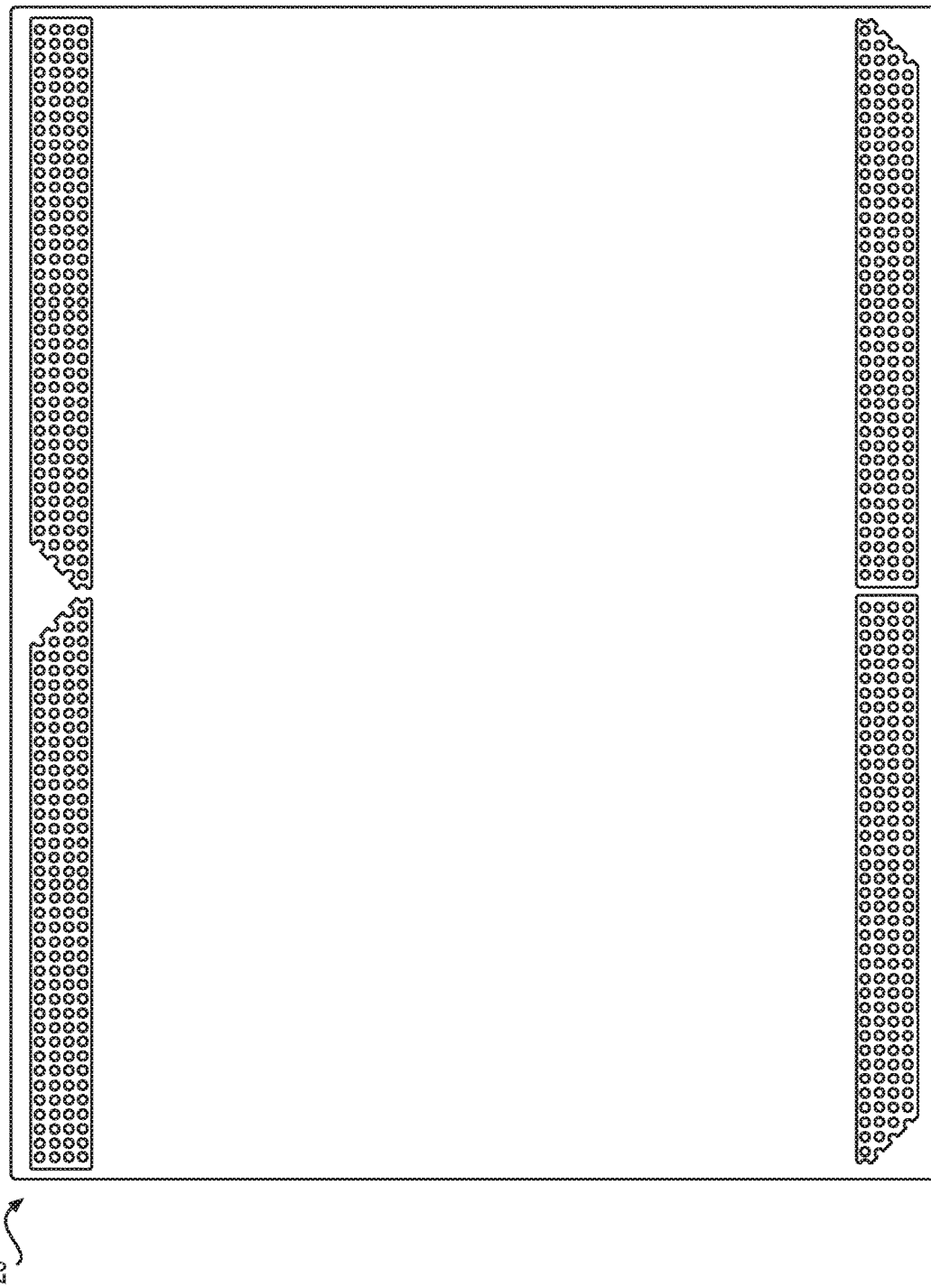
FIG. 15 is a front view of a cathode flow field of FIG. 12, according to an exemplary embodiment.

As shown in FIG. 12, like fuel cells 10, fuel cells 10' can comprise a cathode catalyst layer 12', an anode catalyst layer 14', and a proton exchange membrane (PEM) 16' positioned between cathode catalyst layer 12' and anode catalyst layer 14', which collectively may be referred to as a membrane electrode assembly (MEA) 18'. Fuel cell 10' can comprise two bipolar plates, a cathode plate 20' and an anode plate 22'. Cathode plate 20' may be positioned adjacent cathode catalyst layer 12' and anode plate 22' may be positioned adjacent anode catalyst layer 14'. MEA 18' can be interposed and enclosed between cathode plate 20' and anode plate 22'. Fuel cells 10' may also include electrically-conductive gas diffusion layers (e.g., cathode gas diffusion layer 24' and anode gas diffusion layer 26') within fuel cell 10 on each side of MEA 18. Fuel cell 10' may further include flow fields positioned on each side of MEA 18'. For example, fuel cell 10' may include a cathode flow field 28', which may comprise a porous structure positioned between cathode plate 20' and GDL 24' and an anode flow field 30', which may be formed by anode plate 22'. Fuel cells may also include a plurality of fluid manifolds 31A', 31B' extending along longitudinal axis 5 defined by the series of stacked cathode plates 20' and anode plates 22'. It is to be understood that the description of components, features, operation, and advantageous regarding fuel cells 10, described herein, are equally applicable to fuel cells 10' based on the similarly as illustrated by at least FIGS. 2 and 12. FIGS. 13, 14, and 15 show front views of anode plate 22', cathode plate 20', and cathode flow field 28', according to an exemplary embodiment of fuel cell 10'. In some embodiments, fuel cells 10 may be modified such that the active area is tripled by increasing the active area and repeating the layout of features (e.g., manifolds, passages, and ports, etc.) of fuel cell 10 three times rather than twice as done for fuel cell 10'.

The foregoing description has been presented for purposes of illustration. It is not exhaustive and is not limited to precise forms or embodiments disclosed. Modifications, adaptations, and other applications of the embodiments will be apparent from consideration of the specification and practice of the disclosed embodiments. For example, the described embodiments of fuel cell 10 may be adapted for used with a variety of electrochemical cells. For example, although the present disclosure primarily focus on fuel cells with a anode channel flow field and cathode porous flow field, it is contemplated that some of these features may be utilized in fuel cells utilizing anode and cathode flow fields or fuel cells utilizing anode and cathode porous flow fields.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all cells and cell stacks falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. An electrochemical cell stack, comprising:
a plurality of electrochemical cells stacked along a longitudinal axis, each electrochemical cell comprising:
a membrane electrode assembly comprising a cathode catalyst layer, an anode catalyst layer, and a polymer membrane interposed between the cathode catalyst layer and the anode catalyst layer;
an anode plate and a cathode plate with the membrane electrode assembly interposed therebetween, and the anode plate defines a plurality of channels that form an anode flow field facing the anode catalyst layer;
a cathode flow field positioned between the cathode plate and the cathode catalyst layer, wherein the cathode flow field comprises a porous structure;
a first manifold section that includes an anode feed manifold and a second manifold section that includes an anode discharge manifold;
a first anode distribution channel positioned between the first manifold section and the anode flow field configured to distribute fuel supplied from the anode feed manifold to the anode flow field; and
a second anode distribution channel positioned between the second manifold section and the anode flow field configured to collect fuel from the anode flow field and direct the fuel to the anode discharge manifold; and
a plurality of orifice openings fluidly connecting the first anode distribution channel with the anode flow field, the number of the orifice openings corresponding to the number of channels in the anode flow field.

2. The electrochemical cell stack of claim 1, wherein the first anode distribution channel and the second anode distribution channel are formed between and defined by the membrane electrode assembly and the anode plate along the longitudinal axis, the first anode distribution channel and the second anode distribution channel extend a width of the anode flow field, the first anode distribution channel and the second anode distribution channel have a plurality of support features positioned within.

3. The electrochemical cell stack of claim 2, wherein the support features are evenly spaced throughout the first anode distribution channel and second anode distribution channel, the support features are dimple shaped, and the support features extend from the anode plate in opposite directions along the longitudinal axis.

4. The electrochemical cell stack of claim 2, wherein a ratio of a distance $D_c$ between the support features over a thickness $t_p$ of the cathode plate ranges between about 3 and about 50.

5. The electrochemical cell stack of claim 2, wherein the distance $D_c$ between the support features is about 1.5 mm and the thickness $t_p$ of the cathode plate is about 0.1 mm.

6. The electrochemical cell stack of claim 1, wherein the orifice openings are configured to apply a back pressure on the fuel in the first anode distribution channel, which causes the fuel to fill the first anode distribution channel during operation of the electrochemical cell stack.

7. An electrochemical cell stack, comprising:
a plurality of electrochemical cells stacked along a longitudinal axis, each electrochemical cell comprising:
a membrane electrode assembly comprising a cathode catalyst layer, an anode catalyst layer, and a polymer membrane interposed between the cathode catalyst layer and the anode catalyst layer;
an anode plate and a cathode plate with the membrane electrode assembly interposed therebetween, and the anode plate defines a plurality of channels that form an anode flow field facing the anode catalyst layer; and
a cathode flow field positioned between the cathode plate and the cathode catalyst layer, wherein the cathode flow field comprises a porous structure;
wherein the porous structure is a porous metallic foam structure that has a first cathode distribution channel and a second cathode distribution channel recessed into a surface of the porous metallic foam structure facing the cathode plate, the porous structure comprising a plurality of feed channels and discharge channels recessed into the surface of the porous metallic foam structure facing the cathode plate;
wherein the feed channels start at and are in fluid communication with the first cathode distribution channel and extend toward the second cathode distribution channel, and the discharge channels end at and are in fluid communication with the second cathode distribution channel and extend toward the first cathode distribution channel; and
wherein the cross-sectional area of the feed channels decreases extending away from the first cathode distribution channel toward the second cathode distribution channel at a rate about equal to the rate at which oxidant flows out of the feed channels and diffuses into the porous metallic foam structure.

8. The electrochemical cell stack of claim 7, wherein the porous metallic foam structure includes support features formed throughout the first cathode distribution channel and the second cathode distribution channel, and the support features are dimple, semi-spherical, cone, or cylindrical shaped.

9. The electrochemical cell stack of claim 8, wherein the first cathode distribution channel, the second cathode distribution channel, and the support features are formed by stamping of the porous metallic foam structure, and the first cathode distribution channel and the second cathode distribution channel are configured to promote uniform flow distribution of oxidant along a width of the cathode flow field.

10. The electrochemical cell stack of claim 8, wherein the feed channels and discharge channels are interdigitated and stamped into the surface of the porous metallic foam structure facing the cathode plate.

11. The electrochemical cell stack of claim 10, wherein the width and/or the depth of the feed channels and the discharge channels vary along the length of the porous metallic foam structure.

12. The electrochemical cell stack of claim 11, wherein the width of the feed channels narrow extending away from the first cathode distribution channel toward the second cathode distribution channel while the width of the discharge channels widen extending away from the first cathode distribution channel toward the second cathode distribution channel.

13. The electrochemical cell stack of claim 11, wherein the depth of the feed channels decreases extending away from the first cathode distribution channel toward the second cathode distribution channel while the depth of the discharge channels increases extending away from the first cathode distribution channel toward the second cathode distribution channel.

14. The electrochemical cell stack of claim 11, wherein the cross-sectional area of the discharge channels increases extending away from the first cathode distribution channel toward the second cathode distribution channel.

15. The electrochemical cell stack of claim 14, wherein the cross-sectional area of the discharge channels increases at a rate about equal to the rate at which oxidant flows out of the porous metallic foam structure into the discharge channels, thereby maintaining a velocity of oxidant about constant through the feed channels and the discharge channels.

16. The electrochemical cell stack of claim 10, wherein the porous structure has a first set of channels that begin at the first cathode distribution channel and extend about halfway toward second cathode distribution channel.

17. An electrochemical cell stack, comprising:
a plurality of electrochemical cells stacked along a longitudinal axis, each electrochemical cell comprising:
a membrane electrode assembly comprising a cathode catalyst layer, an anode catalyst layer, and a polymer membrane interposed between the cathode catalyst layer and the anode catalyst layer;
an anode plate and a cathode plate with the membrane electrode assembly interposed therebetween, and the anode plate defines a plurality of channels that form an anode flow field facing the anode catalyst layer; and
a cathode flow field positioned between the cathode plate and the cathode catalyst layer, wherein the cathode flow field comprises a porous structure;
wherein the plurality of channels forming the anode flow field are generally square shaped corrugated channels, the plurality of channels include anode channels open to the anode side configured to direct the flow of fuel across the anode catalyst layer, the plurality of channels also include coolant channels open to the reverse side configured to direct coolant flow; and
wherein a first surface of the porous structure, which faces the membrane electrode assembly, has a higher chromium concentration than a second surface opposite to the first surface.

18. The electrochemical cell stack of claim 17, wherein the coolant channels each have a coolant channel width of A and the anode channels each have an anode channel width of B and a ratio of the coolant channel width A over the anode channel width B is greater than about 1 and less than about 6.

19. The electrochemical cell stack of claim 18, wherein the ratio of the coolant channel width A over the anode channel width B is greater than about 2 and less than about 4 and a depth of the coolant channels and the anode channels is about equal and the channel depth is S, and the ratio of the coolant channel width A plus the anode channel width B divided by the depth S is greater than about 2 and less than about 10.

20. The electrochemical cell stack of claim 17, wherein the porous structure includes at least nickel and chromium and the cathode plate of each cell is formed of uncoated stainless steel.

21. The electrochemical cell stack of claim 20, wherein the porous structure includes a nickel concentration of 60% to 80% by mass and a chromium concentration of 20% to 40% by mass and at least one surface of the porous structure includes a chromium concentration of about 3% to about 50% by mass.

22. The electrochemical cell stack of claim 20, wherein the porous structure includes a chromium concentration of about 3% to about 6%, a tin concentration of about 10% to about 20%, and a nickel concentration of about 74% to about 87%.

23. The electrochemical cell stack of claim 20, wherein the first surface has a chromium concentration ranging from about 3% to about 50% by mass and the second surface has a chromium concentration less than about 3% by mass.

\* \* \* \* \*